(12) United States Patent
Groom et al.

(10) Patent No.: US 7,293,586 B2
(45) Date of Patent: Nov. 13, 2007

(54) FUEL-DISPENSING NOZZLE INHIBITOR

(75) Inventors: J Bradley Groom, Oxford, OH (US); Chad A. McClung, Connersville, IN (US); Michael S. Brock, Connersville, IN (US); Jeffrey E. Devall, Greenup, IL (US)

(73) Assignee: Stant Manufacturing Inc., Connersville, IN (US)

( * ) Notice: Subject to any disclaimer, the term of this patent is extended or adjusted under 35 U.S.C. 154(b) by 0 days.

(21) Appl. No.: 11/424,804

(22) Filed: Jun. 16, 2006

(65) Prior Publication Data

US 2006/0289084 A1 Dec. 28, 2006

Related U.S. Application Data

(60) Provisional application No. 60/716,555, filed on Sep. 13, 2005, provisional application No. 60/692,726, filed on Jun. 22, 2005.

(51) Int. Cl.
*B65B 1/04* (2006.01)

(52) U.S. Cl. .................. 141/350; 141/367; 141/301; 220/86.2

(58) Field of Classification Search ............... 141/301, 141/349, 350, 367; 220/86.2
See application file for complete search history.

(56) References Cited

U.S. PATENT DOCUMENTS

| | | | |
|---|---|---|---|
| 4,034,784 A | 7/1977 | Ball et al. | |
| 4,248,279 A | 2/1981 | Warmbold | |
| 4,687,034 A | 8/1987 | Graiff et al. | |
| 5,212,864 A | 5/1993 | Bates et al. | |
| 5,322,100 A | 6/1994 | Buechler et al. | |
| 5,385,179 A | 1/1995 | Bates et al. | |
| 5,439,129 A | 8/1995 | Buechler | |
| 6,302,169 B1 | 10/2001 | Pulos | |
| 6,382,270 B1 | 5/2002 | Gzik | |
| 6,539,990 B1 | 4/2003 | Levey et al. | |
| 6,607,014 B2 | 8/2003 | Webb | |
| 6,968,874 B1 * | 11/2005 | Gabbey et al. | ............. 141/349 |
| 2002/0020465 A1 | 2/2002 | Gzik | |
| 2002/0170622 A1 | 11/2002 | Webb | |
| 2004/0025967 A1 | 2/2004 | Henry | |
| 2005/0000592 A1 | 1/2005 | Bartlett | |

FOREIGN PATENT DOCUMENTS

| | | |
|---|---|---|
| DE | 10157090 | 4/2003 |
| EP | 1262355 | 12/2002 |
| EP | 1319545 | 6/2003 |
| FR | 2741014 | 5/1997 |
| GB | 2230765 | 10/1990 |
| WO | WO9400351 | 1/1994 |

* cited by examiner

*Primary Examiner*—Steven O. Douglas
(74) *Attorney, Agent, or Firm*—Barnes & Thornburg LLP

(57) ABSTRACT

A nozzle inhibitor is positioned in a filler neck closure assembly between a pivotable outer door and a pivotable inner door to prevent a user from pumping unleaded fuel into a diesel fuel tank. The nozzle inhibitor blocks full insertion of a small-diameter unleaded fuel nozzle into the filler neck closure assembly yet allows full insertion of a large-diameter diesel fuel nozzle into the filler neck closure assembly.

20 Claims, 17 Drawing Sheets

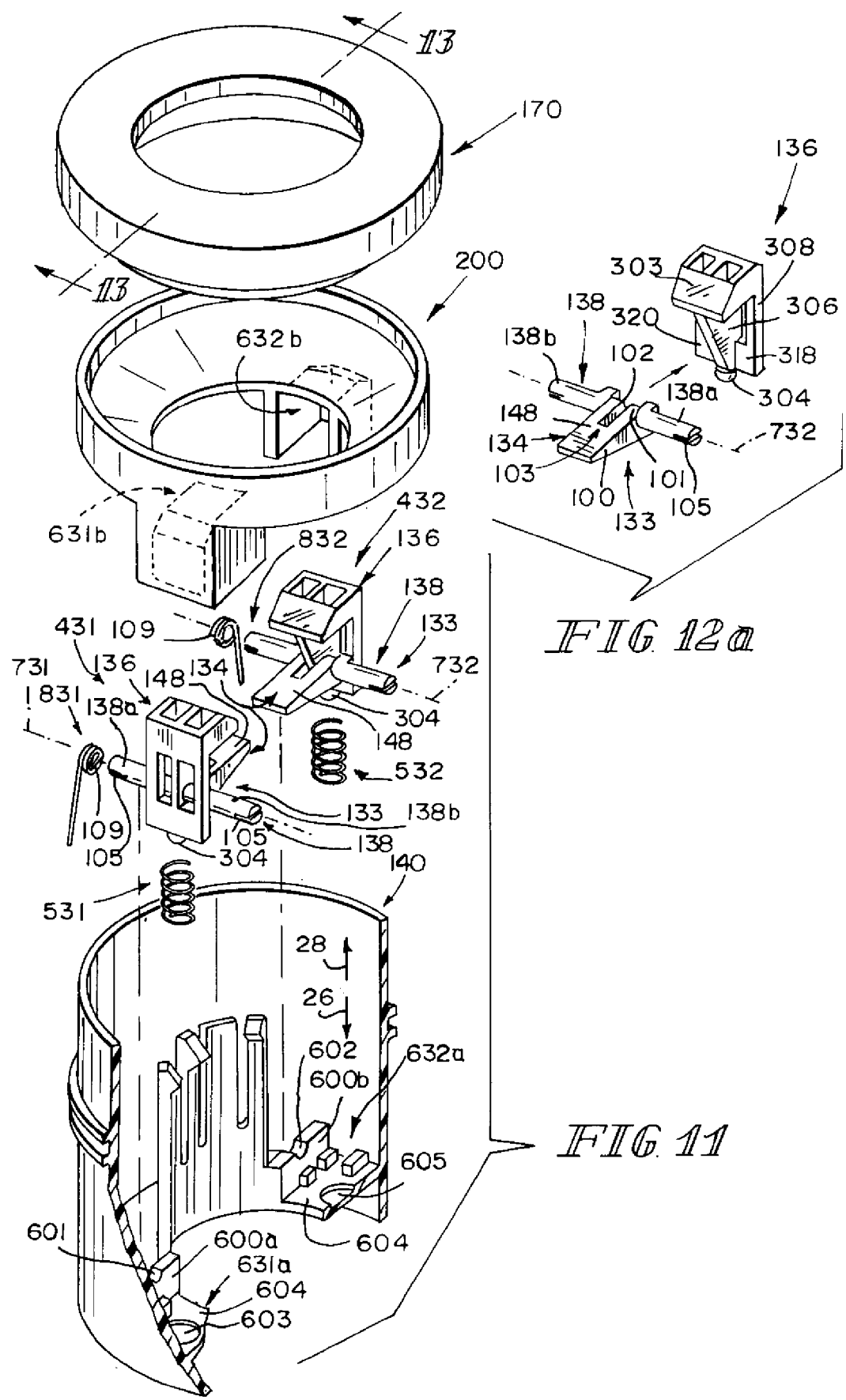

FUEL-DISPENSING NOZZLE INHIBITOR

This application claims priority under 35 U.S.C. § 119(e) to U.S. Provisional Application Ser. No. 60/692,726, filed Jun. 22, 2005 and U.S. Provisional Application Ser. No. 60/716,555, filed Sep. 13, 2005, which are expressly incorporated by reference herein.

BACKGROUND

The present disclosure relates to a filler neck closure assembly, and particularly to a filler neck closure for use in a fuel tank filler neck. More particularly, the present disclosure relates to a device for preventing the introduction of a nozzle for unleaded fuel into the filler neck of a fuel tank of a motor vehicle fitted with a diesel internal combustion engine.

Unleaded fuel should not be introduced into a fuel tank filler neck of a motor vehicle powered by a diesel engine. It is customary to use a small-diameter nozzle (e.g., 22 mm or less) to dispense unleaded fuel into a fuel tank filler neck and to use a larger-diameter nozzle (e.g., 24 mm or more) to dispense diesel and leaded fuel.

SUMMARY

A nozzle inhibitor is configured to be coupled to a fuel tank filler neck and arranged to allow only a fuel-dispensing pump nozzle having an outer diameter that is greater than a specified minimum diameter to be inserted into the filler neck to a depth sufficient so that a user may dispense fuel from that nozzle into a fuel tank coupled to the filler neck. Such a nozzle inhibitor inhibits insertion of a small-diameter unleaded fuel-dispensing nozzle into a fuel tank filler neck, yet allows a large-diameter diesel fuel-dispensing nozzle to be inserted into the fuel tank filler neck.

In an illustrative embodiment, the nozzle inhibitor is mounted inside a fuel tank filler neck. For example, the nozzle inhibitor is interposed in an outer portion provided in a capless filler neck between an outer nozzle-receiving opening and a pivotable inner flapper door that is arranged normally to close an opening leading to an inner portion of the filler neck that is coupled to the fuel tank.

In illustrative embodiments, the nozzle inhibitor includes two or more articulated small-nozzle traps. Each trap includes a radially inwardly extending small-nozzle blocker arm. The small-nozzle blocker arms are arranged normally to block downward (i.e., inward) movement of a "small-diameter" unleaded fuel-dispensing nozzle in the filler neck to open the pivotable inner flapper door, thus preventing unleaded fuel from being discharged from that small-diameter nozzle into the fuel tank of a motor vehicle fitted with a diesel engine.

In a first embodiment of the present disclosure, each articulated small-nozzle trap is constrained to move up and down in channels formed in an inhibitor housing between a raised position wherein the small-nozzle blocker arms are moved to assume small-nozzle trapping, radially inwardly extended positions and a lowered position wherein the small-nozzle blocker arms are moved to assume large-nozzle admitting retracted positions. Illustratively, spring means is provided for normally moving each articulated small-nozzle trap relative to the inhibitor housing to move the small-nozzle blocker arms to the small-nozzle trapping, radially inwardly extended positions. In this embodiment, each small-nozzle trap includes an actuator arm configured to be engaged and moved by a large-diameter nozzle moving into the inhibitor housing. Such movement of the actuator arm causes movement of a companion blocker arm to the retracted position.

In a second embodiment of the present disclosure, each small-nozzle trap includes a small-nozzle blocker arm coupled to an inhibitor housing to pivot about a fixed pivot axis between extended and retracted positions and an actuator arm constrained to move up and down in the inhibitor housing between raised and lowered positions. Illustratively, spring means is provided for normally moving the actuator arm to the raised position and the small-nozzle blocker arm to the extended position. In the raised position, the actuator arm is configured and arranged to block pivotable movement of the small-nozzle blocker arm to the retracted position. In the lowered position, the actuator arm is configured and arranged to allow pivotable movement of the small-nozzle blocker arm to the retracted position. When the actuator arms are lowered, further movement of a large-diameter nozzle into a filler neck causes the small-nozzle blocker arms to move to the retracted positions.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the following figures in which:

FIG. 6 is a view similar to FIGS. 3-5 showing initial contact of a tip of a downwardly moving large-diameter nozzle against an inclined cam ramp provided on the actuator arm of each of the small-nozzle traps and showing that the small-nozzle blocker arm of each of the small-nozzle traps remains in a "passageway-closing," small-nozzle trapping extended position at this stage of nozzle entry into the filler neck;

FIG. 7 is a view similar to FIG. 6 showing that continued downward movement of the large-diameter nozzle causes both of the small-nozzle traps to move downwardly relative to the nozzle inhibitor housing guided by the rod-receiver channels formed in the housing to begin to compress the coiled lift springs under the traps and showing that such trap movement causes a downwardly facing surface of each small-nozzle blocker arm to engage and slide along a top edge of an underlying arm-pivot wall included in the nozzle inhibitor housing to cause each small-nozzle blocker arm to pivot about a companion pivot rod relative to its actuator arm toward a "passageway-opening," large-nozzle admitting retracted position;

FIG. 8 is a view similar to FIGS. 6 and 7 showing further downward movement of the large-diameter nozzle to spread upper ends of the actuator arms included in the small-nozzle traps away from one another to cause a horizontally extending pin coupled to the upper end of each of the actuator arms to ride on a companion downwardly facing inclined ramp provided in the nozzle inhibitor housing and showing movement of each of the small-nozzle blocker arms to the large-nozzle admitting retracted position and full compression of the lift springs underlying each of the small-nozzle traps;

FIG. 9 is a view similar to FIGS. 6-8 showing continued downward movement of the large-diameter nozzle through the nozzle inhibitor housing past the retracted small-nozzle blocker arms toward the closed inner flapper door;

FIG. 10 is a view similar to FIGS. 6-9 showing continued downward movement of the large-diameter nozzle to pivot and open the pivotable inner flapper door located below the small-nozzle traps and mounted on the nozzle inhibitor housing and showing diesel fuel being dispensed from the large-diameter nozzle into the lower portion of the fuel tank filler neck;

FIG. 11 is an exploded perspective view of an outer portion of another filler neck closure assembly showing two opposing small-nozzle traps included in an illustrative fuel-dispensing pump nozzle inhibitor in accordance with another embodiment of the present disclosure and showing that each trap includes a radially inwardly extending small-nozzle blocker arm coupled to a pivot rod adapted to mate with a return (e.g., torsion) spring and an upwardly extending actuator arm associated with the small-nozzle blocker arm and arranged to overlie a lift (e.g., compression) spring;

FIG. 12a is a perspective assembly view showing movement of a pivotable blocker unit comprising a small-nozzle blocker arm interposed between first and second portions of the pivot rod toward a companion actuator arm during assembly to produce the small-nozzle trap shown in FIG. 12b;

FIG. 15 is a view similar to FIGS. 13 and 14 showing initial contact of a tip of a downwardly moving large-diameter nozzle against an inclined cam ramp provided on the actuator arm of each of the small-nozzle traps and showing that the small-nozzle blocker arm of each of the small-nozzle traps remains locked in a "passageway-closing," small-nozzle trapping extended position (owing to pivot-blocking engagement with companion actuator arms) at this stage of nozzle entry into the filler neck;

FIG. 16 is a view similar to FIG. 15 showing that continued downward movement of the large-diameter nozzle causes the actuator arms included in both of the small-nozzle traps to move downwardly relative to the companion small-nozzle blocker arms and to the nozzle inhibitor housing to begin to compress the lift springs under the actuator arms and showing that such actuator arm movement causes a rearwardly extending stop flange of each small-nozzle blocker arm to confront a companion stop flange receiver window formed in the actuator arm to disengage that stop flange from a pivot-blocking plate included in the actuator arm so as to free the small-nozzle blocker arm to pivot on a companion pivot rod about a pivot axis relative to the nozzle inhibitor housing toward a "passageway-opening," large-nozzle admitting retracted position as suggested in FIGS. 17 and 18;

FIG. 17 is a view similar to FIGS. 15-17 showing further downward movement of the large-diameter nozzle to spread upper ends of the actuator arms included in the small-nozzle traps away from one another to open a space between the actuator arms that is wide enough to receive the moving large-diameter nozzle therein and suggesting later pivoting movement of each of the small-nozzle blocker arms (in clockwise and counterclockwise directions) about fixed pivot axes to the large-nozzle admitting retracted position and full compression of the lift springs underlying each of the actuator arms; and FIG. 18 is a view similar to FIGS. 15-17 showing continued downward movement of the large-diameter nozzle through the nozzle inhibitor housing past the retracted small-nozzle blocker arms to pivot and open the pivotable inner flapper door located below the small-nozzle traps and mounted on the nozzle inhibitor housing and showing diesel fuel being dispensed from the large-diameter nozzle into the lower portion of the fuel tank filler neck.

DETAILED DESCRIPTION

Figure 1:
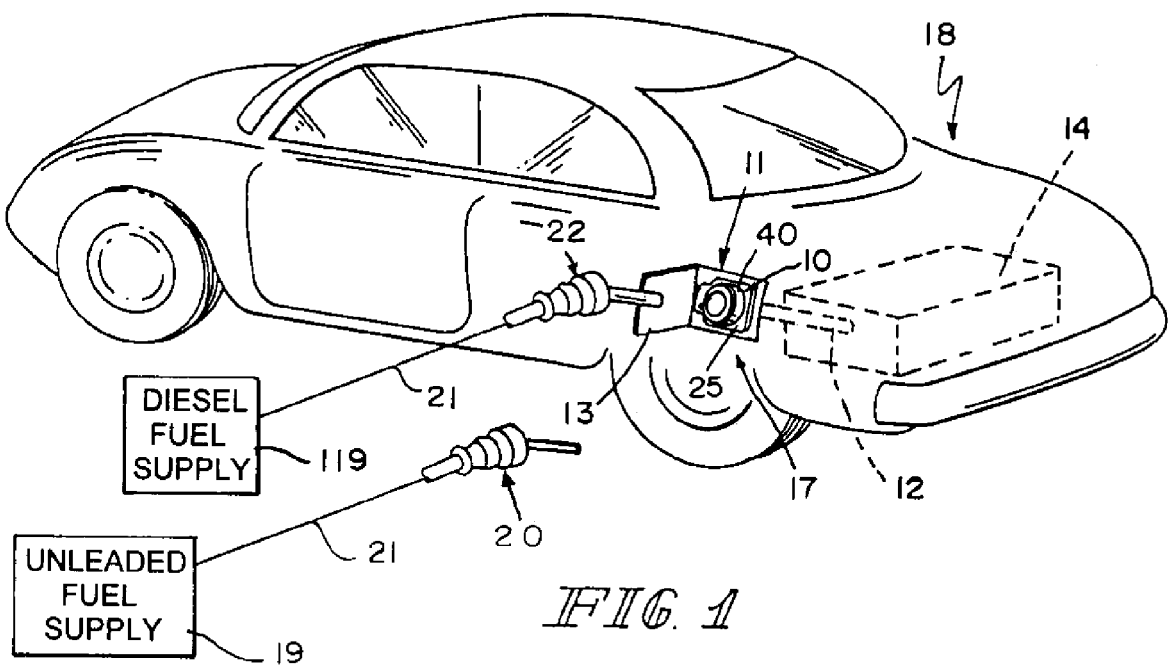
FIG. 1 is a perspective view of a diesel-engine vehicle provided with a "capless" fuel tank filler neck showing an outer filler neck access door moved to an opened position relative to a vehicle body panel to expose an illustrative capless filler neck closure coupled to a filler neck leading to a vehicle fuel tank, showing a large-diameter diesel fuel-dispensing pump nozzle coupled to a diesel fuel supply and configured to be inserted into the filler neck closure assembly during vehicle refueling to discharge liquid fuel into the filler neck leading to the vehicle fuel tank, and showing a small-diameter unleaded fuel-dispensing pump nozzle that is not authorized for use to refuel the vehicle fuel tank.

A nozzle inhibitor 10 is adapted to be mounted in a "capless" filler neck as shown in FIGS. 1-5 to block use of a small-diameter unleaded fuel-dispensing pump nozzle 20 to dispense non-diesel unleaded fuel into a fuel tank 14 of a diesel-engine vehicle 18. Nozzle inhibitor 10 is configured to allow a user to dispense diesel fuel into such a fuel tank using a large-diameter diesel fuel-dispensing pump nozzle 22 as shown, for example, in FIGS. 6-10. A nozzle inhibitor 110 in accordance with a second embodiment of the present disclosure is shown in FIGS. 11-18.

A nozzle inhibitor 10 is associated with a capless filler neck 12 coupled to a vehicle fuel tank 14 as suggested in FIG. 1 to prevent a fuel-purchasing customer from using a fuel-dispensing pump nozzle to discharge unleaded fuel into a vehicle 18 having a diesel engine (not shown) requiring only diesel fuel. Nozzle inhibitor 10 is configured to block full insertion of a small-diameter unleaded fuel nozzle 20 into filler neck 12 as suggested in FIGS. 4 and 5. However, nozzle inhibitor 10 is configured to allow full insertion of a relatively large-diameter diesel fuel nozzle 24 into filler neck 12 as suggested in FIGS. 9 and 10.

As shown in FIG. 1, a capless filler neck closure assembly 11 containing nozzle inhibitor 10 is provided in a vehicle 18 normally to close filler neck 12 extending from fuel tank 14 onboard vehicle 18. During refueling, an outer filler neck access door 13 is moved relative to a vehicle body panel 15 to expose filler neck closure assembly 11 as shown, for example, in FIG. 1. Filler neck closure assembly 11 is located in a chamber 17 formed in vehicle 18 so that filler neck closure assembly 11 is "out of sight" when access door 13 is closed. It is within the scope of the present disclosure to use nozzle inhibitor 110 in vehicle 18 instead of nozzle inhibitor 10.

Small-diameter nozzle 20 is coupled to an unleaded fuel supply 19 by a hose 21. Large-diameter nozzle 22 is coupled to a diesel fuel supply 119 by a hose 21. In many cases, both nozzles 20, 22 will be available at a filling station. Nozzle inhibitor 10 in filler neck closure assembly 11 in vehicle 18 functions to block a consumer from inadvertently using small-diameter nozzle 20 to discharge unleaded fuel into a fuel tank filler neck of a vehicle that uses only diesel fuel.

Figure 2:
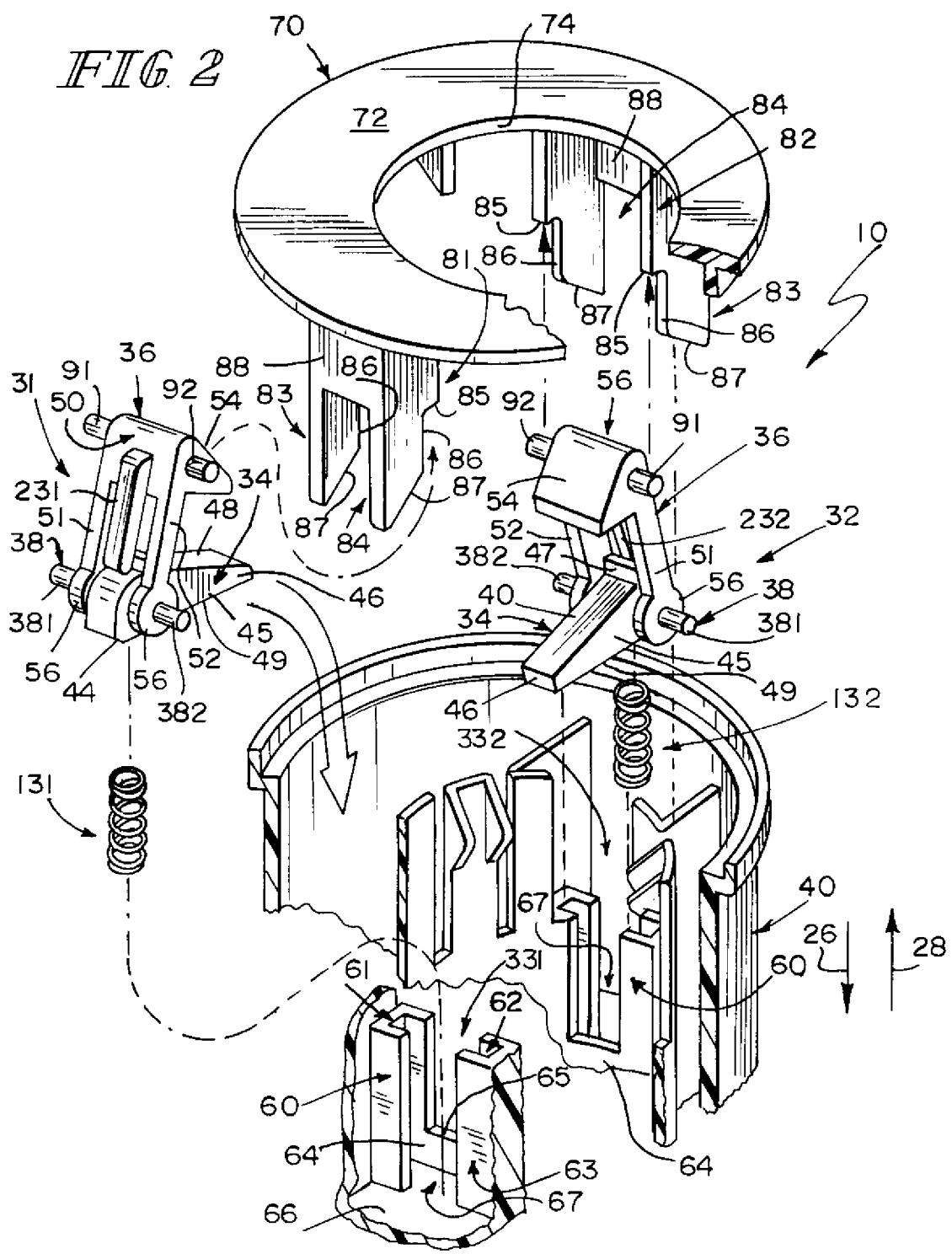
FIG. 2 is an enlarged perspective assembly view of an outer portion of the filler neck closure assembly of FIG. 1 showing two opposing articulated small-nozzle traps included in an illustrative fuel-dispensing pump nozzle inhibitor in accordance with the present disclosure and showing that each trap includes a radially inwardly extending small-nozzle blocker arm mounted for pivotable movement about a pivot rod coupled to a lower portion of an upwardly extending actuator arm and arranged to slide up and down in two opposing rod-receiver channels formed in a nozzle inhibitor housing and a coiled lift spring located in a space provided between the two opposing rod-receiver channels and arranged to yieldably resist downward movement of the free ends of the pivot rod in the two opposing rod-receiver channels and of the actuator and small-nozzle blocker arms.
Figure 3:
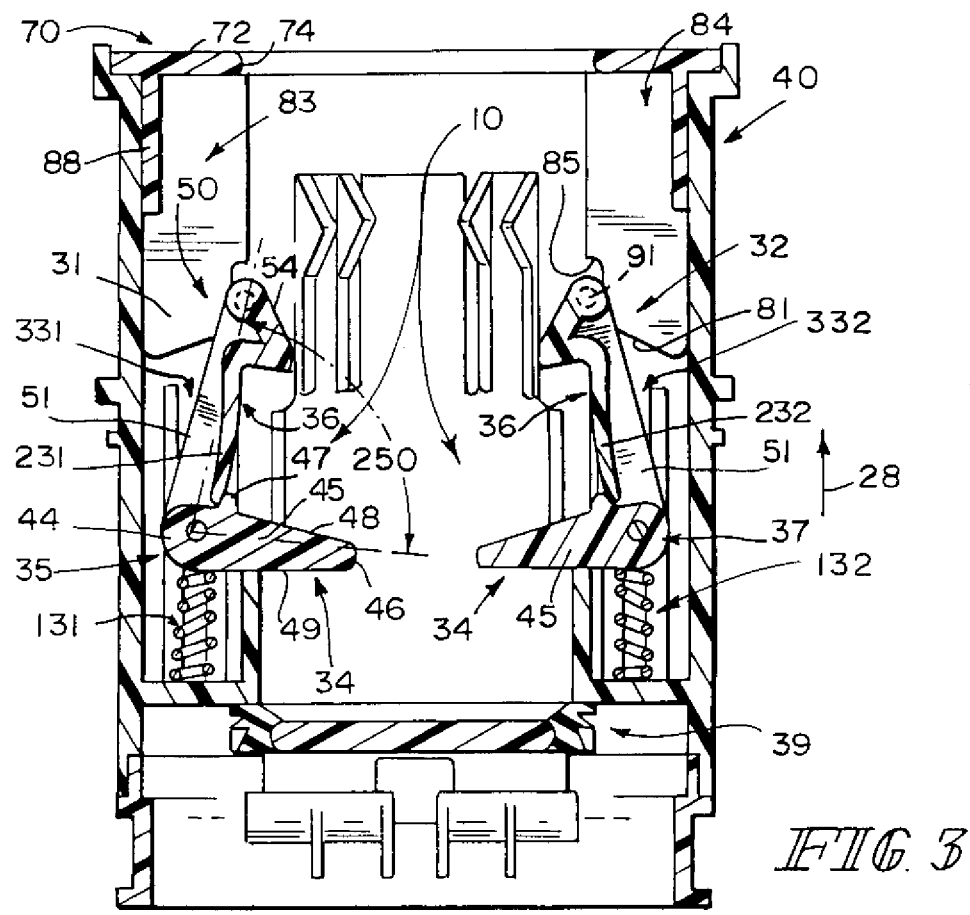
FIG. 3 is a sectional view taken along line 3-3 of FIG. 2 (after assembly of the components shown in FIG. 2) showing both articulated small-nozzle traps mounted for movement in a space in the nozzle inhibitor housing located between an outer nozzle-receiving opening and an inner flapper door to cause movement of the small-nozzle blocker arms from small-nozzle trapping radially inwardly extended positions shown in FIGS. 3 and 4 to large-nozzle admitting retracted positions shown in FIGS. 8-10.

Nozzle inhibitor 10 includes, for example, first and second small-nozzle traps 31, 32, a first lift spring 131 associated with first small-nozzle trap 31, and a second lift spring 132 associated with second small-nozzle traps 32 as shown in FIGS. 2 and 3. Nozzle inhibitor 10 is mounted for movement in a nozzle inhibitor housing 40 to block entry of small-diameter nozzle 20 as shown, for example, in FIGS. 3-5 yet allow entry of large-diameter nozzle 22 as shown, for example, in FIGS. 6-10.

Figure 6:
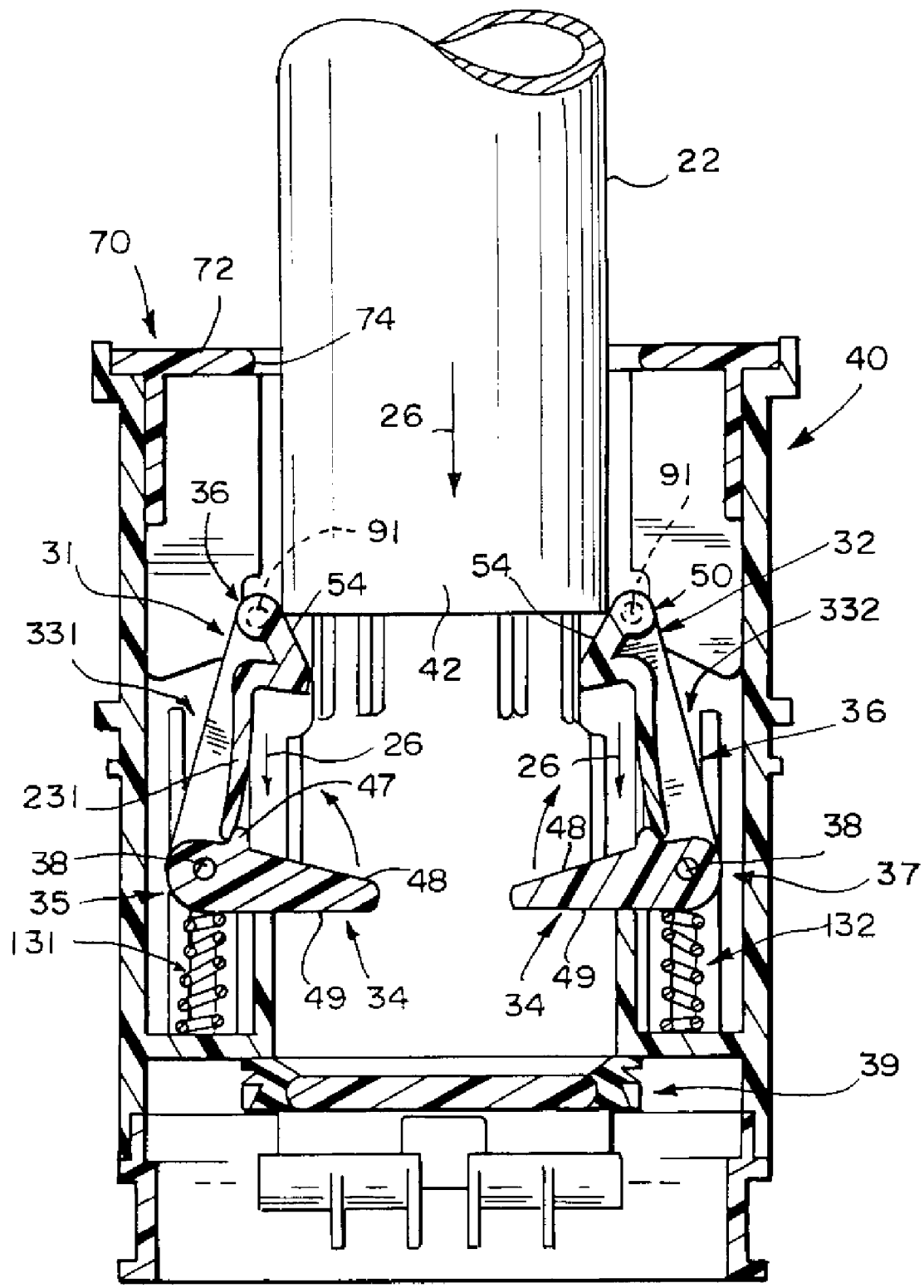
FIGS. 6-10 show downward movement of an "authorized" large-diameter "diesel" fuel-dispensing pump nozzle in a nozzle inhibitor housing in a fuel tank filler neck to "disable" the two opposing articulated small-nozzle traps (by retracting the small-nozzle blocker arms) and "open" the pivotable inner flapper door to enable a nozzle operator to pump diesel fuel into a fuel tank through the fuel tank filler neck using the large-diameter diesel fuel-dispensing pump nozzle.
Figure 7:
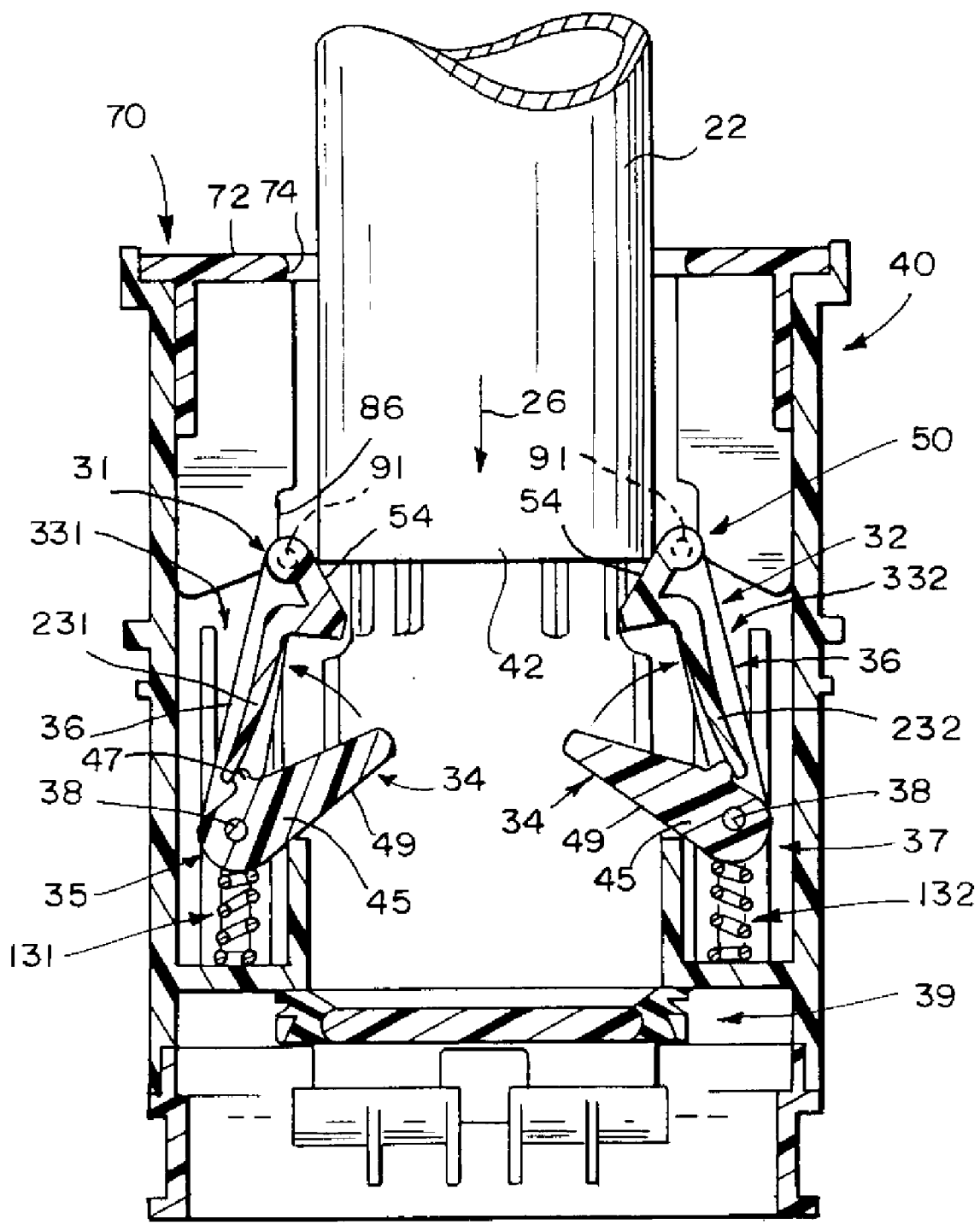
Figure 8:
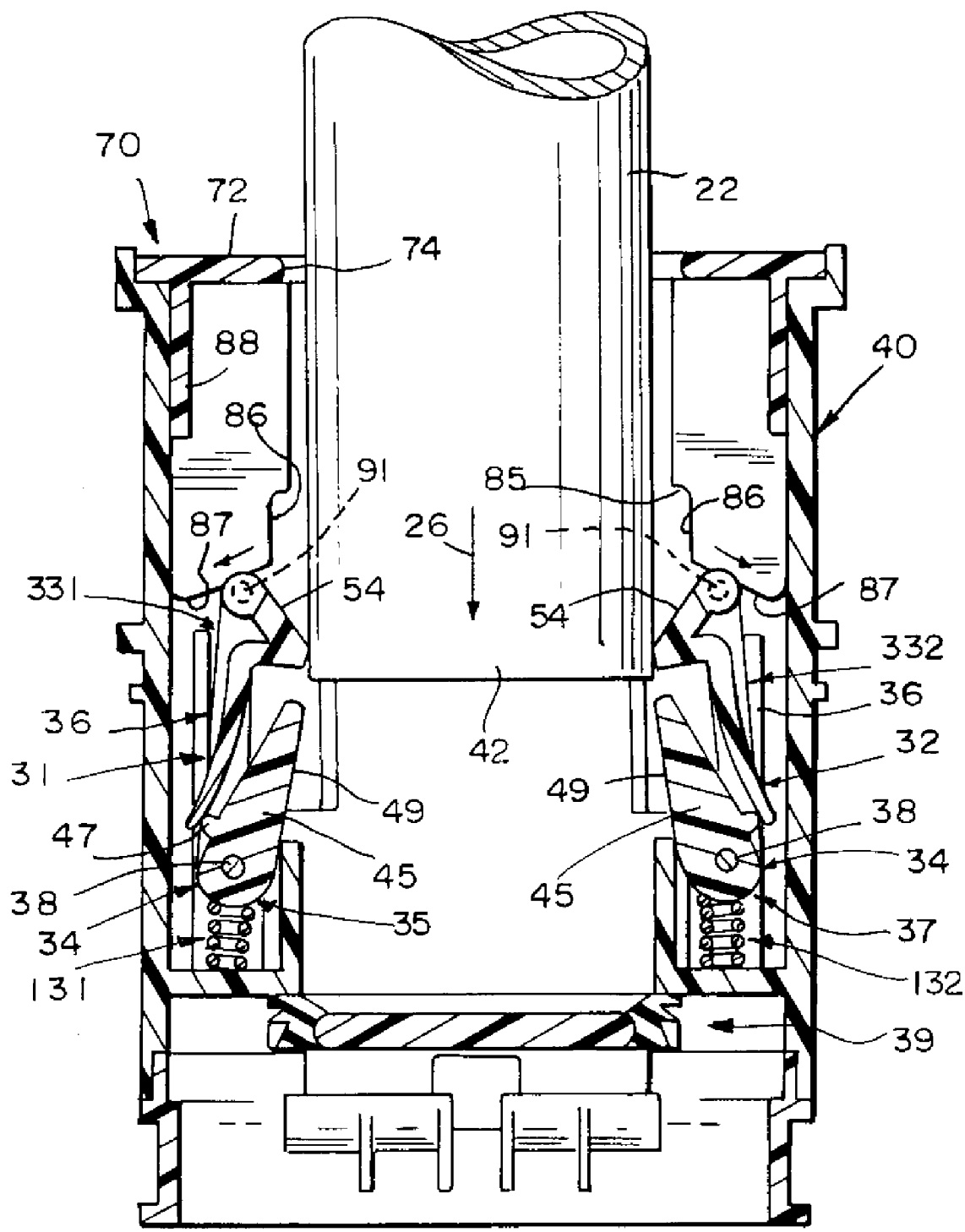
Figure 10:
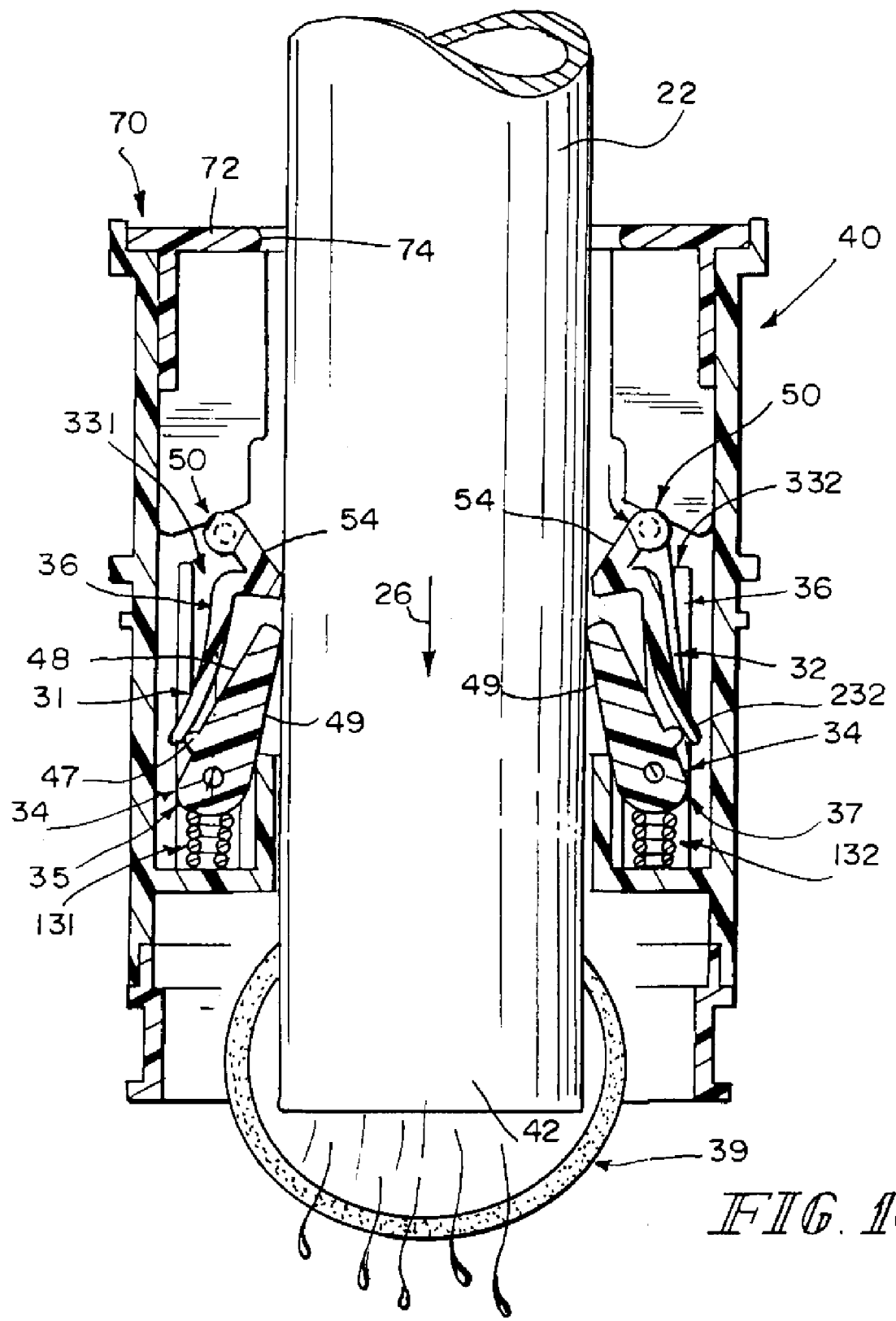

Nozzle inhibitor housing 40 includes a first trap guide 331 configured to provide means for guiding up-and-down movement of first small-nozzle trap 31 relative to nozzle inhibitor housing 40 during movement of first small-nozzle trap 31 in downward direction 26 to compress first lift spring 131 as suggested in FIGS. 6-8 and also during movement of first small-nozzle trap 31 in upward direction 28 in response to a lifting force applied by the compressed first lift spring 131 as it decompresses as suggested in FIG. 3 following removal of large-diameter nozzle 22 from nozzle inhibitor housing 40 (see, e.g., FIG. 10). Nozzle inhibitor housing 40 also includes a second trap guide 332 configured to provide means for guiding up-and-down movement of second small-nozzle trap 32 in downward direction 26 to compress second lift spring 132 as suggested in FIGS. 6-8 and also during movement of second small-nozzle trap 32 in upward direction 28 in response to a lifting force applied by the compressed second lift spring 132 as it decompresses as suggested in FIG. 3.

Each small-nozzle trap 31, 32 further includes a small-nozzle blocker arm 34 and an actuator arm 36 mounted on a pivot rod 38 coupled to the companion small-nozzle blocker arm 34 as shown, for example, in FIGS. 2 and 3. First small-nozzle trap 31 includes a first blocker unit 35 comprising a small-nozzle blocker arm 34 and a companion actuator arm 36 as suggested, for example, in FIGS. 3-10. Second small-nozzle trap 32 includes a second blocker unit 37 comprising another small-nozzle blocker arm 34 and a companion actuator arm 36 as suggested, for example, in FIGS. 3-10.

As suggested in FIGS. 2 and 3, small-nozzle blocker arms 34 of first and second small-nozzle traps 31, 32 are moved normally by, respectively, return springs 231 and 232, to assume small-nozzle trapping radially inwardly extended positions and cooperate to block movement of a small-diameter non-diesel fuel-dispensing pump nozzle 20 to reach and open a normally closed inner flapper door 39 provided in nozzle inhibitor housing 40 so that non-diesel (e.g., unleaded) fuel cannot be dispensed into fuel tank filler neck 14. As suggested in FIGS. 6-8, a tip 42 of a large-diameter diesel fuel-dispensing pump nozzle 22 can contact and move actuator arms 36 of first and second small-nozzle traps 31, 32 to cause both small-nozzle blocker arms 34 to pivot about their companion pivot rods 38 (to compress or load return springs 231 and 232) and move to large-nozzle admitting retracted positions inside nozzle inhibitor housing 40 to allow further downward movement of large-diameter nozzle 22 in direction 26 to reach and open normally closed inner flapper door 39 so that diesel fuel can be dispensed into fuel tank filler neck 14 as suggested in FIGS. 9 and 10.

Actuator arms 36 of first and second blocker units 35, 37 cooperate to define means for establishing a small-nozzle channel therebetween adapted to receive the small-diameter unleaded fuel nozzle therein upon movement of the small-diameter unleaded fuel nozzle in interior region of nozzle inhibitor housing to contact first and second blocker units 35, 37 while first and second blocker units 35, 37 are urged to assume their small-nozzle blocking extended positions. First return spring 231 is coupled to actuator arm 36 of first blocker unit 35 and configured to provide means for pivoting first blocker unit 35 about a first pivot axis relative to the companion actuator arm 36 normally to increase an included angle defined between blocker arm of first blocker unit 35 and the companion actuator arm 36 to cause blocker arm 34 of first blocker unit 35 to move away from the large-nozzle admitting retracted position to assume the small-nozzle blocking extended position. Second return spring is coupled to actuator arm 36 of second blocker unit 37 and configured to provide means for pivoting second blocker unit 37 about a second pivot axis relative to actuator arm 36 of second blocker unit 37 normally to increase an included angle 250 defined between blocker arm 34 of second blocker unit 37 and companion actuator arm 36 to cause the blocker arm 34 of second blocker unit 37 to move away from the large-nozzle admitting retracted position to assume the small-nozzle blocking extended position.

Each of first and second small-nozzle traps 31, 32 is constrained to move up and down in channels formed in the nozzle inhibitor housing 40 between a raised position shown in FIGS. 1 and 2 wherein blocker arms 34 of first and second blocker units 35, 37 are moved to assume the small-nozzle blocking extended positions and a lowered position shown in FIG. 10 wherein blocker arms 34 of first and second blocker units 35, 37 are moved to assume the large-nozzle admitting retracted positions. First lift spring 131 is configured to provide means normally for yieldably moving first small-nozzle trap 31 relative to nozzle inhibitor housing 40 to the raised position so that blocker arm 34 of first blocker unit 35 is moved to assume the small-nozzle blocking extended position and actuator am 36 of first blocker unit 35 is arranged to be engaged and moved by a large-diameter nozzle 22 moving in the interior region of nozzle inhibitor housing 40 toward the passageway of the fill tube to cause movement of blocker arm 34 of first blocker unit 35 to the large-nozzle admitting retracted position as suggested in FIG. 10. Second lift spring 132 is configured to provide means for normally yieldably moving second small-nozzle trap 32 relative to nozzle inhibitor housing 40 to the raised position so that blocker arm 34 of second blocker unit 37 is moved to assume the small-nozzle blocking extended position and actuator arm 36 of second blocker unit 37 is arranged to be engaged and moved by a large-diameter nozzle 22 moving in the interior region of nozzle inhibitor housing 40 toward the passageway of the fill tube to cause movement of blocker arm 34 of second blocker unit to the large-nozzle admitting retracted position as also suggested in FIG. 10.

As suggested in FIGS. 2 and 3, each small-nozzle blocker arm 34 includes an outer portion 44 coupled to pivot rod 38, an opposite inner portion 46, and a middle portion 45 between outer and inner portions 44, 46. Small-nozzle blocker arm 34 also includes an upwardly facing surface 48 and a downwardly facing surface 49. Upwardly facing surface 48 is arranged to face upwardly in direction 28 and downwardly facing surface 49 is arranged to face downwardly in direction 26 upon movement of small-nozzle blocker arm 34 to assume the small-nozzle trapping, radially inwardly extending position shown in FIG. 3. Upwardly facing surface 48 and downwardly facing surface 49 are arranged to diverge in a direction extending from inner portion 46 toward outer portion 44 as shown, for example, in FIG. 3. An upwardly extending protuberance 47 is coupled to upwardly facing surface 48 and arranged to lie on rear portion 44 near pivot rod 38 as shown best in FIG. 3.

As suggested in FIGS. 2 and 3, each actuator arm 36 includes an upper portion 50 formed to include an upwardly facing inclined cam ramp 54 and downwardly extending first and second segments 51, 52 cantilevered to upper portion 50. Actuator arm 36 of first small-nozzle trap 31 is coupled to a downwardly extending first return spring 231 including a proximal end cantilevered to companion upper portion 50 and arranged to lie in a space between companion first and second segments 51, 52 and a free end arranged to contact companion protuberance 47 on rear portion 44 of companion small-nozzle blocker arm 34 of first blocker unit 35. Likewise, actuator arm 36 of second small-nozzle trap 32 is coupled to a downwardly extending second return spring 232 including a proximal end cantilevered to companion upper portion and arranged to lie in a space between companion first and second segments 51, 52 and a free end arranged to contact companion protuberance 47 on rear portion 44 of companion small-nozzle blocker arm 34 of second blocker unit 37. First and second return springs 231, 232 are configured to help pivot or otherwise urge companion blocker arms 34 to assume the extended position as the companion blocker arm 34 is raised by an underlying lift spring 131 or 132. In an illustrative embodiment, a monolithic member molded of a suitable plastics material is configured to provide first return spring 231 and actuator arm 36 of first small-nozzle trap 31. Also, another monolithic member molded of a suitable plastics material is configured to include second return spring 232 and actuator arm 36 of second small-nozzle tray 32.

As suggested in FIGS. 2 and 3, pivot rod 38 is arranged to extend through apertures formed in outer portion 44 of small-nozzle blocker arm 34 and in lower portions 56 of each of first and second segments 51, 52 to support small-nozzle blocker arm 34 for pivotable movement on pivot rod 38 relative to actuator arm 36. Such a union facilitates pivotable movement of small-nozzle blocker arm 34 from its extended position shown in FIG. 3 to its retracted position shown in FIG. 9. Opposite free ends 381 and 382 of pivot rod 38 are exposed and sized to fit into and slide up and down in companion rod-receiver channels formed in first or second trap guides 331, 332.

As suggested in FIG. 2, each of first and second trap guides 331, 332 includes a first upright member 60 formed to include a vertically extending rod-receiver channel 61 opening toward a vertically extending rod-receiver channel 62 formed in a nearby second upright member 63. An arm-pivot wall 64 extends between first and second upright members 60, 63 as suggested in FIG. 2 and lies below downwardly facing surface 49 of small-nozzle blocker arm 34 as suggested in FIG. 3. A top edge 65 of arm-pivot wall 64 is arranged to confront and, in the illustrated embodiment, contact downwardly facing surface 49 at about middle portion 45 of small-nozzle blocker arm 34 when small-nozzle blocker arm 34 lies in its radially inwardly extended position as shown in FIG. 3. In the illustrated embodiment, each of companion first and second upright members 60, 63 has a C-shaped transverse cross-section and is anchored to a floor 66 provided in nozzle inhibitor housing 40 and other interior walls included in housing 40 to cause members 60, 63 to lie in spaced-apart parallel confronting relation to one another to provide a lift spring-receiving space 67 therebetween.

When assembled, free end 381 of pivot rod 38 is arranged to slide up and down in rod-receiver channel 61 formed in first upright member 60 and free end 382 of pivot rod 38 is arranged to slide up and down in rod-receiver channel 62 formed in second upright member 60 as suggested in FIGS. 2 and 6-9. Rear portion 44 of small-nozzle blocker arm 34 moves toward floor 66 of nozzle inhibitor housing 40 to compress lift spring 131 (or 132) therebetween during downward movement of first small-nozzle trap 31 in direction 26 as suggested in FIGS. 6-9. Once downward pressure on first small-nozzle trap 31 is relieved (e.g., by removing a large-diameter nozzle 22 from nozzle inhibitor housing 40), lift spring 131 will decompress and move first small-nozzle trap 31 in upward direction 28 relative to first and second upright members 60, 63 included in first trap guide 331 (or second trap guide 332) to allow small-nozzle blocker arm 34 to move from its retracted position to its extended position. At about the same time, the first and second return springs 231, 232 coupled to actuator arms 36 of first and second small-nozzle traps 31, 32 (which return springs 231, 232 are "compressed" or "loaded" to store energy upon movement of blocker arms 34 to their retracted positions) will decompress to apply a force to protuberances 47 on blocker arms 34 that applies a torque causing blocker arms 34 of first and second blocker units 35, 37 to rotate about companion pivot rods 38 and about top edges 65 of nearby arm-pivot walls 64 to help urge small-nozzle blocker arms 34 to assume the extended positions. Thus, lift springs 131, 132 and return springs 231, 232 cooperate to provide an arm-return system for moving each blocker arm 34 from the retracted position to the extended position as soon as a large-diameter nozzle 22 is removed from the filler neck.

As suggested in FIGS. 2 and 3, a lid 70 is coupled to a top portion of nozzle inhibitor housing 40. Lid 70 includes a cover plate 72 formed to include an outer nozzle-receiving opening 74 and first and second trap limiters 81, 82 extending downwardly from an underside 76 of cover plate 72 in direction 28. Each of first and second trap limiters 81, 82 includes a downwardly extending first leg 83 and a downwardly extending second leg 84 arranged to lie in spaced-apart parallel relation to first leg 83. Each leg 84 includes a horizontally extending stop wall 85, an inclined guide wall 87, and a vertically extending guide wall 86 interconnecting walls 85 and 87 as shown, for example, in FIGS. 2 and 3. A stiffener plate 88 extends laterally between each companion set of first and second legs 83, 84 as shown, for example, in FIGS. 2 and 3.

As suggested in FIGS. 2 and 3, first nozzle trap 31 includes a horizontally extending first pin 91 arranged to ride on guide walls 86 and 87 of first leg 83 of first trap limiter 83 and a horizontally extending second pin 92 arranged to ride on guide walls 86 and 87 of second leg 84 of first trap limiter 83 during up-and-down movement of first small-nozzle trap 31 in nozzle inhibitor housing 40. Similarly, second nozzle trap 32 includes similar pins 91, 92 for riding on guide walls 86,87 of first and second legs 83, 84 of second trap limiter 84 during up-and-down movement of second small-nozzle trap 32 in nozzle inhibitor housing 40.

Figure 4:
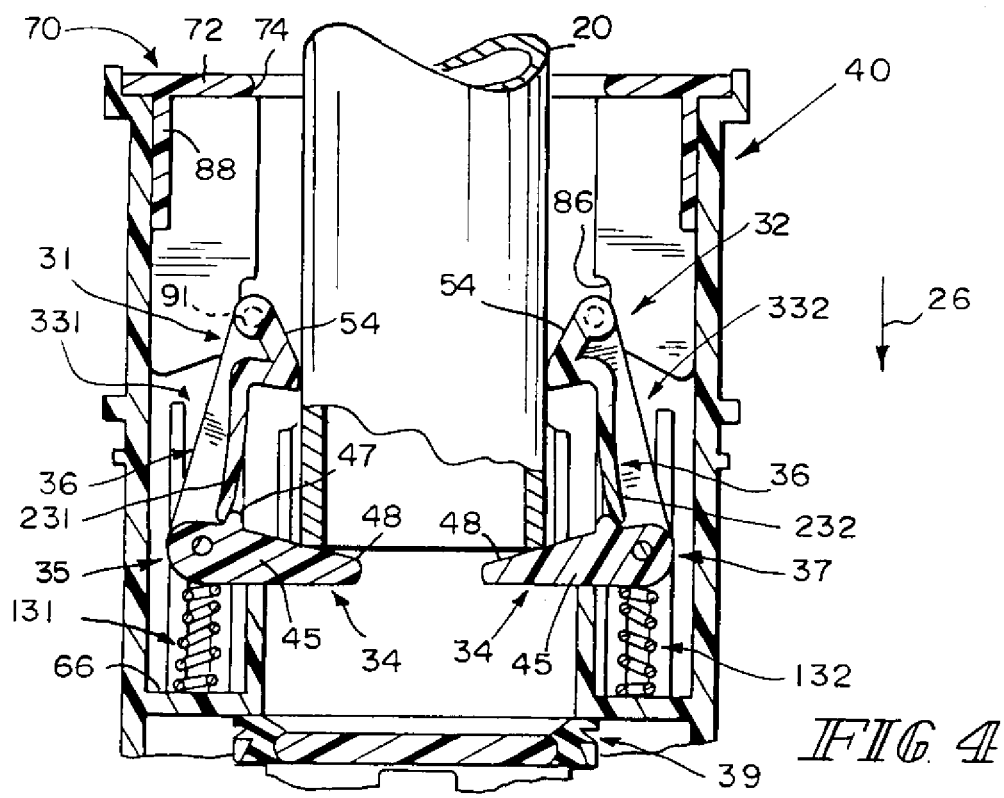
FIG. 4 is a view similar to FIG. 3 showing initial movement of an "unauthorized" small-diameter "non-diesel" fuel-dispensing pump nozzle into the nozzle inhibitor housing providing an outer portion of a filler neck coupled to a "diesel" fuel tank and showing engagement of a tip of the small-diameter nozzle against upwardly facing surfaces provided on the two radially inwardly extending small-nozzle blocker arms so that further downward movement of the nozzle toward the inner flapper door is blocked before the nozzle can "reach and open" the closed inner flapper door.
Figure 5:
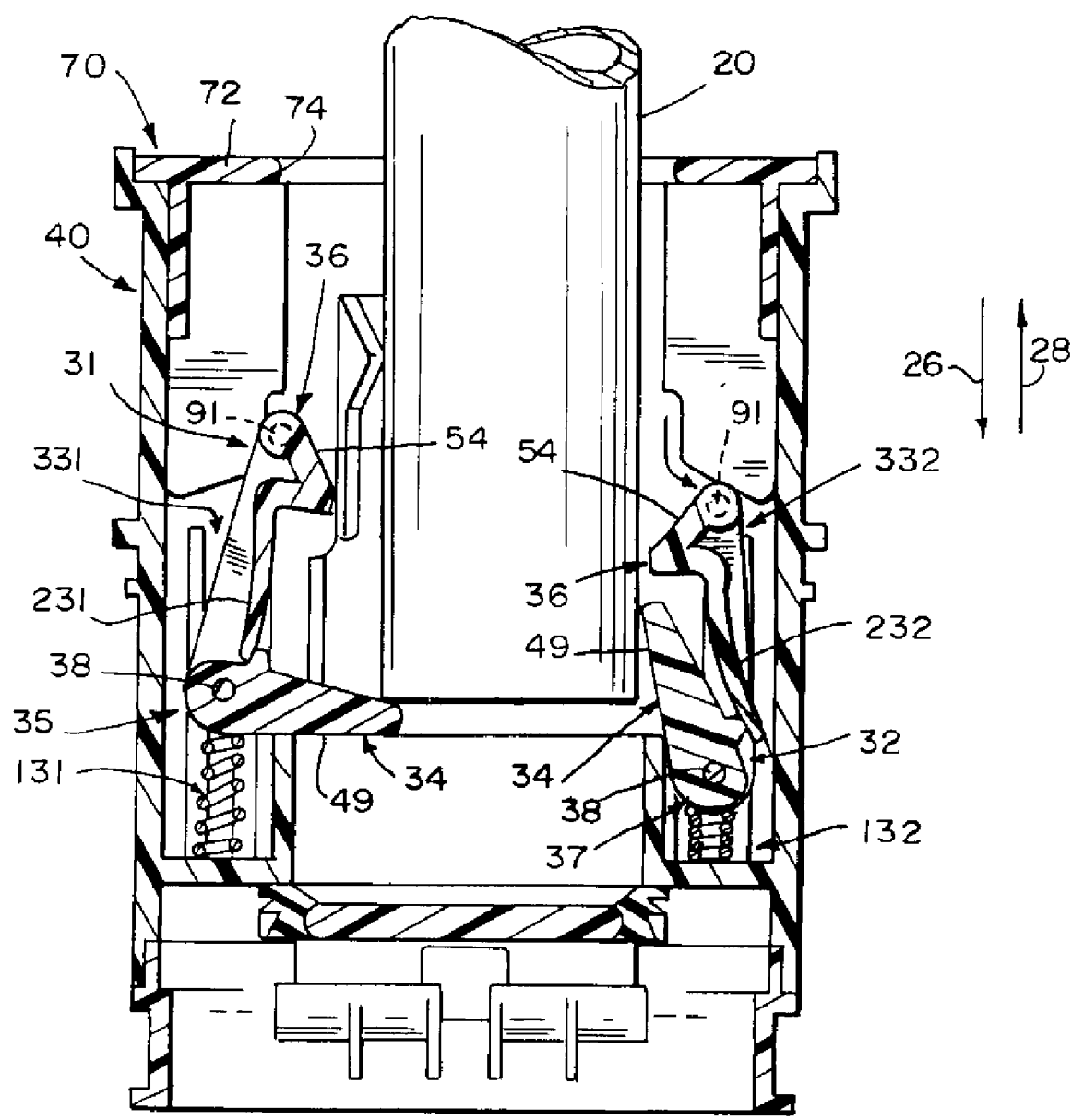
FIG. 5 is a view similar to FIGS. 3 and 4 showing use of at least one of the small-nozzle blocker arms in a radially inwardly extended position to block further inward movement of the small-diameter nozzle toward the closed inner flapper door even when the nozzle is canted in the filler neck closure assembly to pivot another of the small-nozzle blocker arms to a retracted position.

In use, first and second small-nozzle traps 31, 32 are activated by a large-diameter nozzle 22 moving in downward direction 26 causing blocker arms 34 to rotate about a pivot out of the path of nozzle 22 and compress or load first and second return springs 231, 232. After traveling a set distance in downward direction (established by engagement of pins 91, 92 on guide walls 86), actuator arms 36 will pivot out of the path of nozzle 22 and cause blocker arms 34 to move to retracted positions as shown in FIGS. 6-10. A relatively small-diameter nozzle 20 is unable to move both (or all if more than two) of the small-nozzle traps 31, 32 causing nozzle 20 to be stopped by small-nozzle blocker arms 34 as shown in FIG. 4.

Nozzle inhibitor 10 is configured to be coupled to a fuel tank filler neck and arranged to allow only a fuel-dispensing pump nozzle 22 having an outer diameter that is greater than a specified minimum diameter to be inserted into the filler neck 12 to a depth sufficient so that a user may dispense fuel from that nozzle 22 into a fuel tank 14 coupled to filler neck 12. Such a nozzle inhibitor 10 inhibits insertion of a small-diameter unleaded fuel-dispensing nozzle 20 into a fuel tank filler neck 12, yet allows a large-diameter diesel fuel-dispensing nozzle 22 to be inserted into the fuel tank filler neck 12.

Nozzle inhibitor 10 is mounted inside a fuel tank filler neck 12. For example, nozzle inhibitor 10 is interposed in an outer portion 40 provided in a capless filler neck 12 between an outer nozzle-receiving opening 74 and a pivotable inner flapper door 39 that is arranged normally to close an opening leading to an inner portion of filler neck 12 that is coupled to fuel tank 14. It is also within the scope of this disclosure to include nozzle inhibitor in a filler neck closure using a filler neck closure cap.

Nozzle inhibitor 10 includes two or more articulated small-nozzle traps 31, 32. Each trap 31, 32 includes a radially inwardly extending small-nozzle blocker arm 34. The small-nozzle blocker arms 34 are arranged normally to block downward (i.e., inward) movement of a "small-diameter" unleaded fuel-dispensing nozzle 20 in filler neck 12 to open pivotable inner flapper door 39, thus preventing unleaded fuel from being discharged from that small-diameter nozzle 20 into fuel tank 12 of a motor vehicle fitted with a diesel engine.

Each illustrative small-nozzle trap 31, 32 further includes an actuator arm 36 arranged to contact any "large-diameter" diesel fuel-dispensing nozzle 22 admitted into outer portion 40 of filler neck 12 and a return spring (231 or 232) configured to urge a middle portion 45 of a companion small-nozzle blocker arm 34 in a downward direction 26 to engage a top edge 65 of an arm-pivot wall 64 included in nozzle inhibitor 10. Because each blocker arm 34 is coupled for pivotable movement to its companion actuator arm 36, continued downward movement of actuator arms 36 in response to a force applied by the downwardly moving large-diameter nozzle 22 causes a downwardly facing surface 49 of each blocker arm 34 to engage and slide along top edge 65 of a nearby arm-pivot wall 64 and thus pivot the blocker arms 34 from small-nozzle trapping radially inwardly extended positions to large-nozzle admitting retracted positions. Retraction of blocker arms 34 opens a passageway extending in outer portion 40 of filler neck 12 from outer nozzle-receiving opening 74 to pivotable inner flapper door 39 so that a pump operator is able to move a large-diameter diesel fuel-dispensing pump nozzle 22 further into filler neck 12 to "reach an open" the normally closed pivotable inner flapper door 39 and dispense diesel fuel into a fuel tank 14 coupled to that filler neck 12.

In illustrative embodiments, lift springs 131, 132 are arranged to move each of small-nozzle traps 31, 32 in an upward direction 28 in response to removal of a large-diameter nozzle 22 from filler neck 12. Such lift springs 131, 132 function to raise each blocker arm 34 above its companion arm-pivot wall 64 and cooperate with return springs 231, 232 to urge blocker arms 34 to move from their large-nozzle admitting retracted positions to their small-nozzle trapping radially inwardly extended positions. Such movement restores the normal small-diameter nozzle-blocking function of the two small-nozzle traps 31, 32 included in nozzle inhibitor 10.

Initial movement of an "unauthorized" small-diameter "non-diesel" fuel-dispensing pump nozzle 20 into the nozzle inhibitor housing 40 providing an outer portion of filler neck 12 coupled to "diesel" fuel tank 14 is shown in FIG. 4. A tip of small-diameter nozzle 20 engages against upwardly facing surfaces 48 provided on the two radially inwardly extending small-nozzle blocker arms 34 so that further downward movement of nozzle 20 toward inner flapper door 39 is blocked before nozzle 20 can "reach and open" the closed inner flapper door 39.

Downward movement of an "authorized" large-diameter "diesel" fuel-dispensing pump nozzle 22 in a nozzle inhibitor housing 40 in a fuel tank filler neck 12 to "disable" the two opposing articulated small-nozzle traps 31, 32 (by retracting the small-nozzle blocker arms 34) and "open" the pivotable inner flapper door 39 to enable a nozzle operator to pump diesel fuel into a fuel tank 14 through the fuel tank filler neck 12 using the large-diameter diesel fuel-dispensing pump nozzle 22 is shown, for example, in FIGS. 6-10. Initial contact of a tip 42 of a downwardly moving large-diameter nozzle 22 against an inclined cam ramp 54 provided on actuator arm 36 of each of small-nozzle traps 31, 32 remains in a "passageway-closing," small-nozzle trapping extended position at this stage of nozzle entry into the filler neck 12.

Continued downward movement of large-diameter nozzle 22 causes both of small-nozzle traps 31, 32 to move downwardly relative to nozzle inhibitor housing 40 guided by rod-receiver channels 61, 62 formed in housing 40 to begin to compress coiled lift springs 131, 132 under the traps 31, 32 is shown in FIG. 7. Such trap movement causes a downwardly facing surface 49 of each small-nozzle blocker arm 34 to engage and slide along a top edge 65 of an underlying arm-pivot wall 64 included in the nozzle inhibitor housing 40 to cause each small-nozzle blocker arm 34 to pivot about a companion pivot rod 38 relative to its actuator arm 36 toward a "passageway-opening," large-nozzle admitting retracted position as shown in FIG. 7.

Further downward movement of large-diameter nozzle 22 to spread the upper ends of actuator arms 36 included in small-nozzle trap away from one another to cause a horizontally extending pin 91, 92 coupled to the upper end of each of actuator arms 36 to ride on a companion downwardly facing inclined ramp 87 provided in nozzle inhibitor housing 40 is shown in FIG. 8. Movement of each of small-nozzle blocker arms 34 to the large-nozzle admitting retracted position and full compression of the lift springs 131, 132 underlying each of the small-nozzle traps 31, 32 is also shown in FIG. 8.

Figure 9:
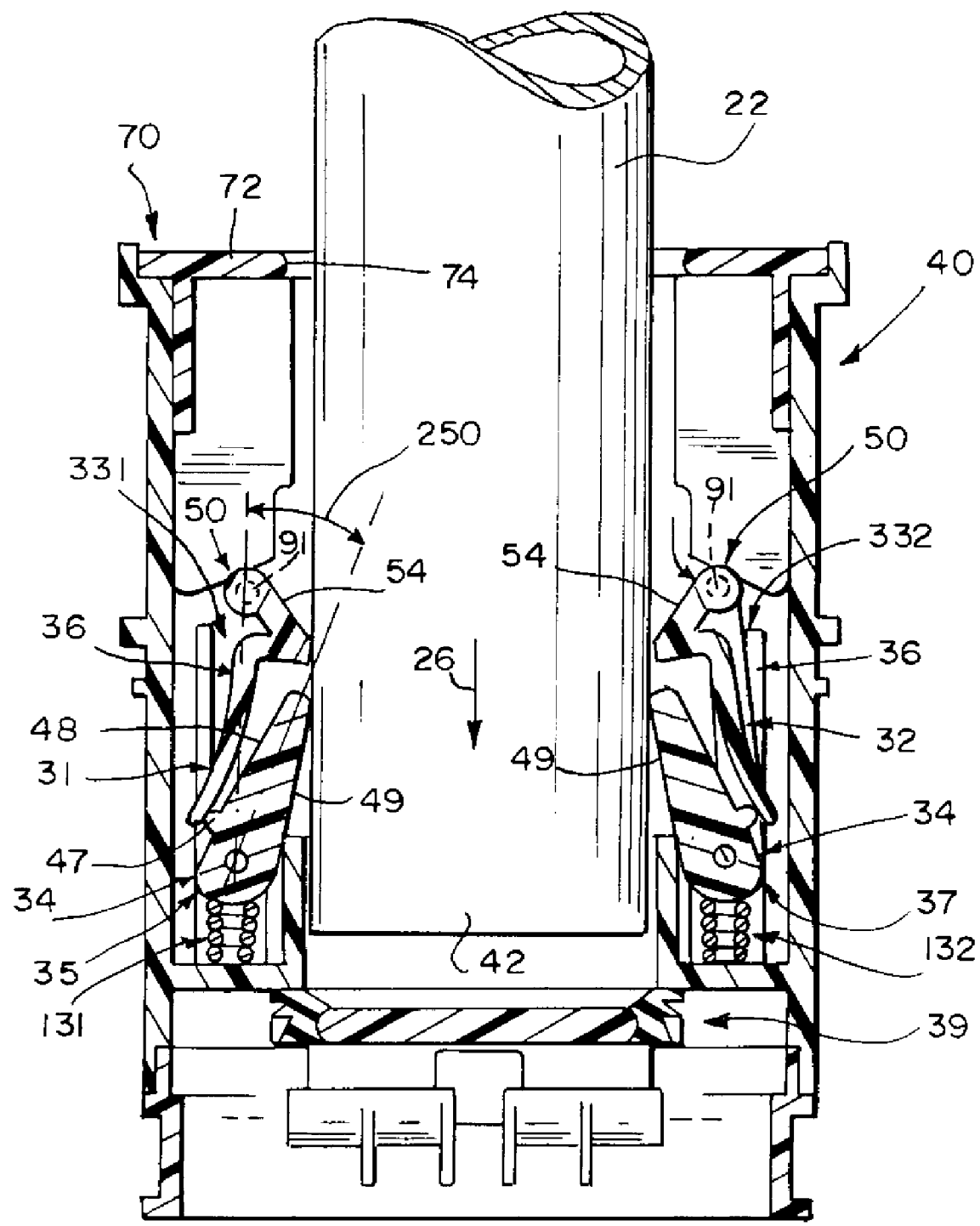

Continued downward movement of large-diameter nozzle 22 through nozzle inhibitor housing 40 past the retracted small-nozzle blocker arms 34 toward closed inner flapper door 139 is shown in FIG. 9. Continued downward movement of large-diameter nozzle 12 to pivot and open pivotable inner flapper door 39 located below small-nozzle traps 31, 32 and mounted on nozzle inhibitor housing 40 to allow diesel fuel to be dispensed from large-diameter nozzle 22 into the lower portion of fuel tank filler neck 12 is shown in FIG. 10.

Each illustrative small-nozzle trap 31 or 32 further includes an actuator arm 36 arranged to contact any "large-diameter" diesel fuel-dispensing nozzle 22 admitted into the outer portion of filler neck 12 and to urge a "middle" portion 45 of a companion small-nozzle blocker arm 34 in a downward direction to engage a top edge 65 of an arm-pivot wall 64 included in nozzle inhibitor 10. Because each blocker arm 34 is coupled for pivotable movement to its companion actuator arm 36, continued downward movement of actuator arms 36 in response to a force applied by the downwardly moving large-diameter nozzle 32 causes a downwardly facing surface of each blocker arm 34 to engage and slide along a top edge 65 of a nearby arm-pivot wall 64 and thus pivot blocker arms 34 from small-nozzle trapping radially inwardly extended positions shown in FIG. 4 to large-nozzle admitting retracted positions shown in FIG. 9. Retraction of blocker arms 34 opens a passageway extending in the outer portion of filler neck 12 from the outer nozzle-receiving opening to pivotable inner flapper door 39 so that a pump operator is able to move a large-diameter diesel fuel-dispensing pump nozzle 22 further into filler neck 12 to "reach and open" the normally closed pivotable inner flapper door and dispense diesel fuel into a fuel tank coupled to filler neck 12.

In illustrative embodiments, an arm-return system is provided for moving each blocker arm 34 from the retracted position to the extended position as soon as a large-diameter nozzle 22 is removed from filler neck 12 so that small-nozzle blocker arms 34 are moved automatically to resume their small-nozzle trapping radially inwardly extended positions shown in FIG. 4. For example, a lift spring 131 or 132 is arranged to underlie each blocker arm 34 and configured to move the adjacent small-nozzle trap in an upward direction in response to removal of a large-diameter nozzle 22 from filler neck 12. A return spring 231 or 232 is coupled to each of actuator arms 36 and configured to help pivot its companion blocker arm 34 about the top edge 65 of the nearby arm-pivot wall 64 to assume the extended position as the companion blocker arm 34 is raised by lift spring 131 or 132. Such lift and return springs cooperate to raise each blocker arm 34 above and pivot about its companion arm-pivot wall 64, thus freeing blocker arms 34 to move from their large-nozzle admitting retracted positions shown in FIG. 9 to their small-nozzle trapping radially inwardly extended positions shown in FIG. 4. Such movement restores the normal small-diameter nozzle-blocking function of the two small-nozzle traps 31, 32 included in nozzle inhibitor 10.

Nozzle inhibitor 110 is provided in accordance with a second embodiment of the present disclosure as shown, for example, in FIGS. 11-18. Nozzle inhibitor 110 includes, for example, first and second small-nozzle traps 431, 432, a first lift spring 531 included in first small-nozzle trap 431, and a second lift spring 532 included in second small-nozzle trap 432. Nozzle inhibitor 110 is mounted for movement in a nozzle inhibitor housing 140 to block entry of small-diameter nozzle 20 as shown, for example, in FIGS. 13 and 14, yet allow entry of large-diameter nozzle 22 as shown, for example, in FIGS. 15-18.

Figure 13:
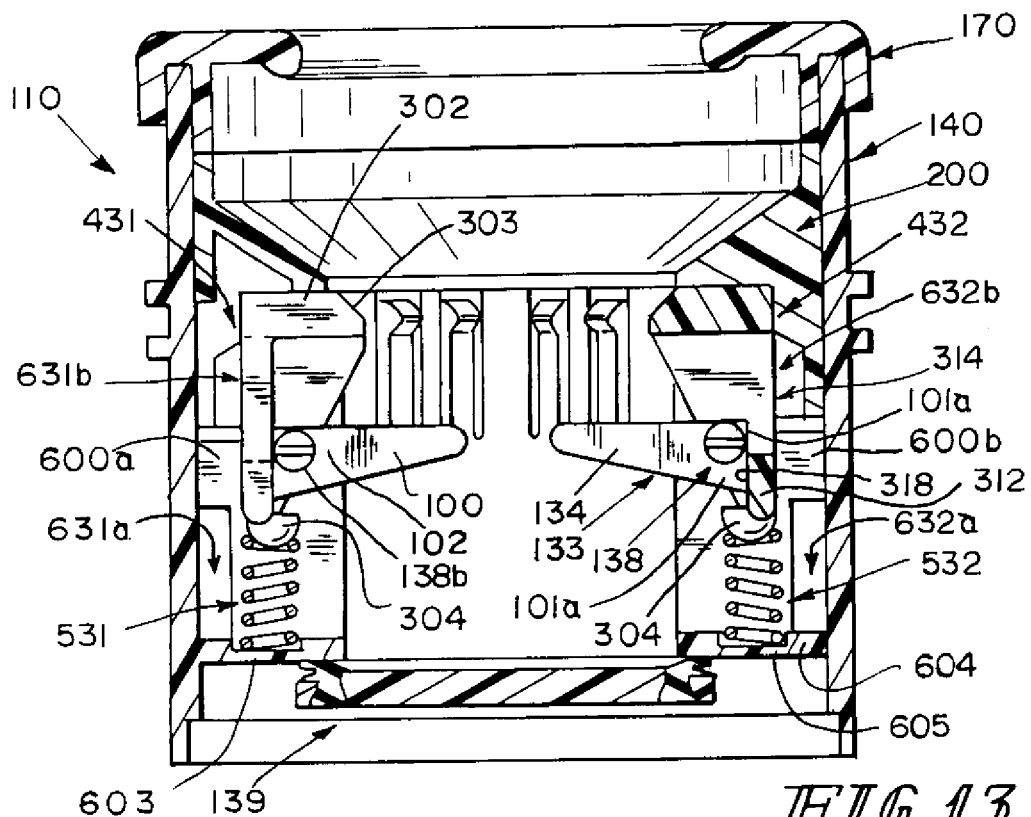
FIG. 13 is a sectional view taken along line 13-13 of FIG. 11 (after assembly of the components shown in FIG. 11) showing both small-nozzle traps mounted for movement in a nozzle inhibitor housing and showing engagement of a radially outer portion of the pivotable blocker unit in each small-nozzle trap with a companion actuator arm (while the actuator arm is spring-biased upwardly to assume a "raised" position in the inhibitor housing) to block "downward" pivoting movement of the small-nozzle blocker arm in each pivotable blocker unit about its companion pivot rod to establish a "locked" radially inwardly extended position of each small-nozzle blocker arm.

Nozzle inhibitor housing 140 is formed to include a first lower trap mount 631a adapted to support first small-nozzle trap 431 and a second lower trap mount 632a adapted to support second small-nozzle trap 432 as suggested in FIGS. 11 and 13. A lid 170 is coupled to a top portion of nozzle inhibitor housing 140 and a nozzle guide 200 is sized to fit into nozzle inhibitor housing 140 in a position interposed between lid 70 and first and second small-nozzle traps 431, 432 as suggested in FIGS. 11 and 13. Nozzle guide 200 is formed to include a first upper trap mount 631b arranged to overlie first lower trap mount 631a and a second upper trap mount 632b arranged to overlie second lower trap mount 632a as suggested in FIG. 11.

Each small-nozzle trap 431, 432 includes a pivotable blocker unit 133 and an actuator arm 136 associated with pivotable blocker unit 133 as shown, for example, in FIG. 11. Each pivotable blocker unit 133 includes a small-nozzle blocker arm 134 and a pivot rod 138 coupled to small-nozzle blocker arm 134 as shown, for example, in FIGS. 1, 12a, and 12c. In an illustrative embodiment, each pivotable blocker unit 133 is a monolithic element made of a plastics material. Each actuator arm 136 can be moved downwardly in nozzle-inhibitor housing 140 in direction 26 by a moving large-diameter nozzle 22 from a normal "raised" position shown in FIGS. 13 and 14 to a "lowered" position shown in FIGS. 16-18 to "unlock" a companion blocker arm 134 so that the blocker arm 134 can be moved by large-diameter nozzle 22 from an extended position shown in FIGS. 13 and 14 to a retracted position shown in FIG. 18.

Each pivot rod 138 is adapted to be coupled to nozzle inhibitor housing 140 (or some component coupled thereto) to establish a "stationary" fixed pivot axis 731 for small-nozzle blocker arm 134 in first small-nozzle trap 431 and a stationary fixed pivot axis 732 for small nozzle-blocker arm 134 in second small-nozzle trap 432. In this way, small-nozzle blocker arm 134, once unlocked, in first small-nozzle trap 431 is able to pivot about fixed pivot axis 731 relative to nozzle inhibitor housing 140 to move to its retracted position as suggested, for example, in FIGS. 17 and 18. Similarly, small-nozzle blocker arm 134, once unlocked, in second small-nozzle trap 432 is able to pivot about fixed pivot axis 732 relative to nozzle inhibitor housing 140 to move to its retracted position as suggested, for example, in FIGS. 17 and 18.

Figure 12B:
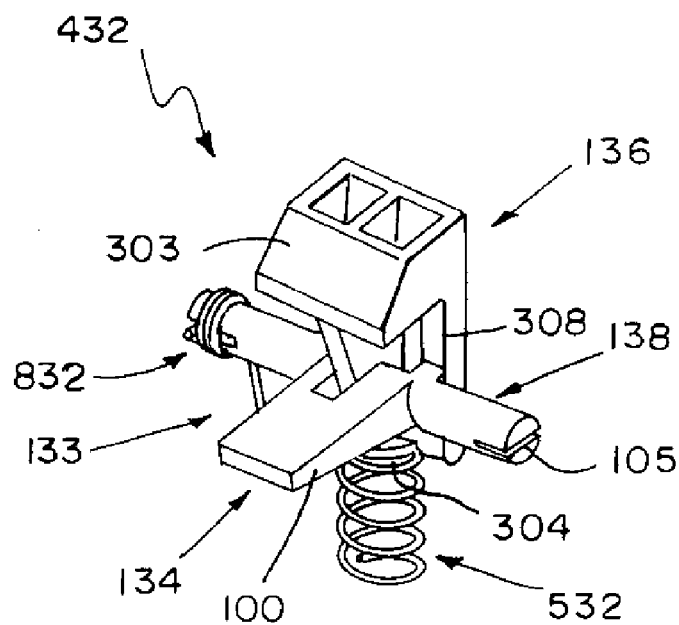
FIG. 12b is an enlarged view of an illustrative small-nozzle trap showing a lift spring located under the actuator arm and a return spring coupled to the second portion of the pivot rod and adapted to be coupled to the nozzle inhibitor housing.
Figure 12C:
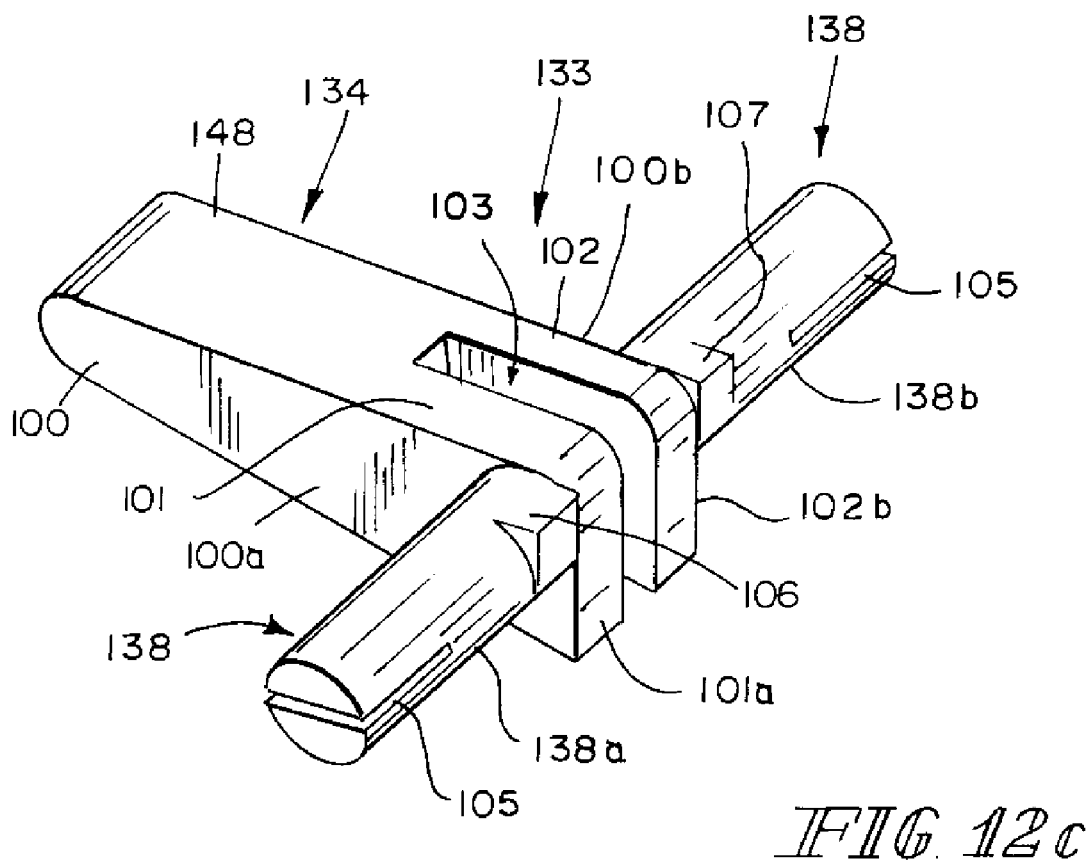
FIG. 12c is an enlarged perspective view of the pivotable blocker unit of FIGS. 12a and 12b showing the small-nozzle blocker arm and the pivot rod and showing a nozzle barrier and two spaced-apart stop flanges included in the small-nozzle blocker arm and two spaced-apart rod portions coupled to the stop flanges and included in the pivot rod.
Figure 14:
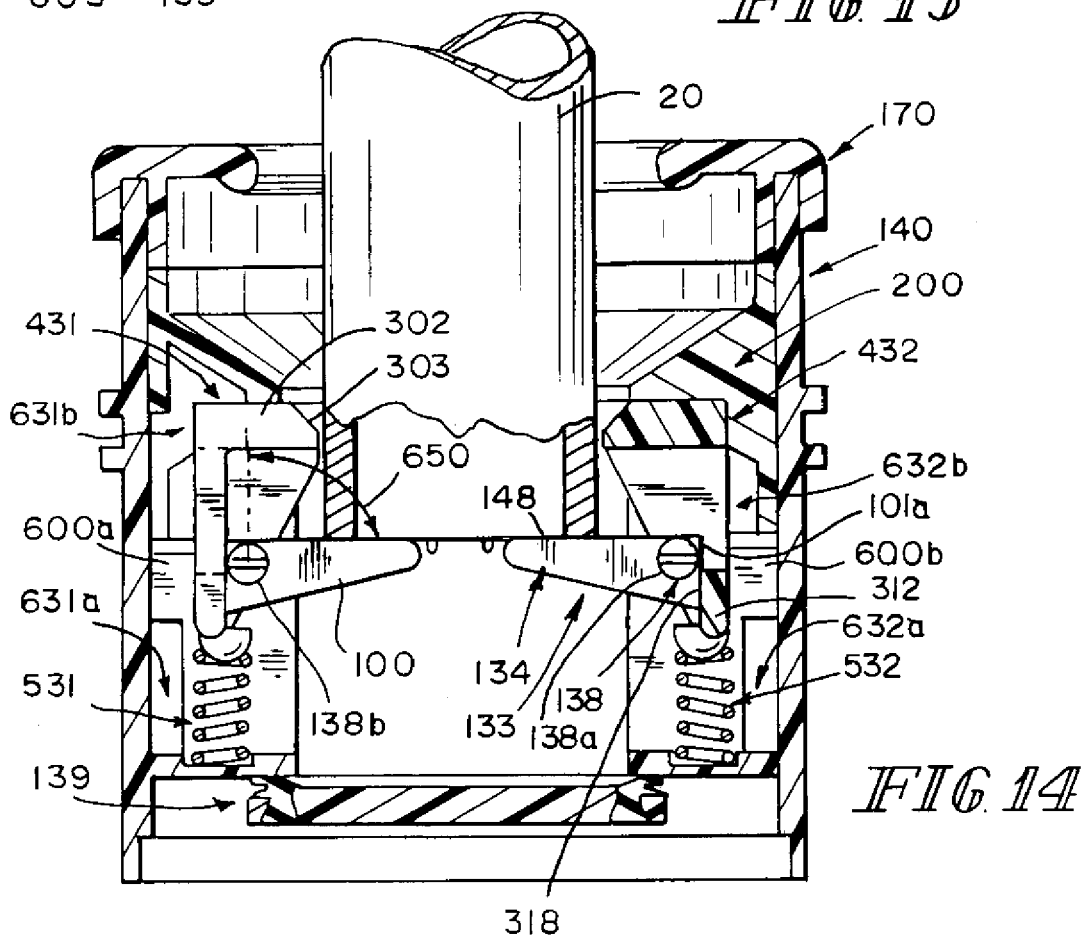
FIG. 14 is a view similar to FIG. 13 showing initial movement of an "unauthorized" small-diameter "non-diesel" fuel-dispensing pump nozzle into the nozzle inhibitor housing and showing engagement of a tip of the small-diameter nozzle against upwardly facing surfaces provided on the nozzle barriers included in the two (locked) radially inwardly extending small-nozzle blocker arms so that further downward movement of the small-diameter nozzle toward an inner flapper door is blocked before the nozzle can "reach and open" the normally closed inner flapper door.

As suggested in FIG. 12c, each small-nozzle blocker arm 134 includes a nozzle barrier 100, first and second stop flanges 101, 102 coupled (e.g., cantilevered) to a radially outer section of nozzle barrier 100 and arranged to lie in spaced-apart relation to one another to define a slot 103 therebetween. Nozzle barrier 100 includes an upwardly facing surface 148 arranged to face upwardly in direction 28 to contact a tip of either a small-diameter nozzle 20 as suggested in FIG. 14 or a large-diameter nozzle 22 as suggested in FIGS. 17 and 18 as one of those nozzles 20 or 22 is moved downwardly in direction 26. First stop flange 101 includes a first stop face 101a shown in FIGS. 12c and arranged to engage a portion of a companion actuator arm 136 when actuator arm 136 is located in its raised position as shown in FIGS. 13 and 14. Second stop flange 102 includes a second stop face 102b shown in FIGS. 12c and arranged to engage a portion of a companion actuator arm 136 when actuator arm 136 is located in its raised position.

As suggested in FIG. 12c, pivot rod 138 includes a first rod portion 138a cantilevered to an exterior side wall 100a of first stop flange 101 and a second rod portion 138b cantilevered to an exterior side wall 100b of second stop flange 102. Each rod portion 138a and 138b is formed to include a slot 105 at its free end that is sized to receive a tang 109 included in a return spring 831 or 832 as suggested in FIGS. 11 and 12b. Return springs 831 and 832 provide means for yieldably urging blocker arms 134 to move from their retracted positions to their extended positions. A first pivot limiter 106 is appended to an exterior surface of first pivot rod portion 138a in close proximity to first stop flange 101 and a second pivot limiter 107 is appended to an exterior surface of second pivot rod portion 138b in close proximity to second stop flange 102 as suggested, for example, in FIGS. 12c. These pivot limiters 106 and 107 contact portions of companion actuator arms 136 upon movement of actuator arms 136 to their raised positions to cause blocker arms 134 to remain normally in the "horizontal" extended positions shown in FIGS. 13 and 14.

A pivot support mount for pivot rod 138 included in first small-nozzle trap 431 is provided, for example, in first lower trap mount 631a as suggested in FIG. 11. A pair of spaced-apart upstanding walls 600a (only one of which is shown) is provided in first lower trap mount 631a to define a space receiving small-nozzle blocker arm 134, first lift spring 531, and actuator arm 136 of first small-nozzle trap 431 therebetween. Each of upstanding walls 600a is formed to include a rod receiver channel 601 configured to receive one of first and second rod portions 138a and 138b to establish the location of fixed pivot axis 731 in nozzle inhibitor housing 140. Similarly, a pivot support mount for pivot rod 138 included in second small-nozzle trap 432 is provided, for example, in second lower trap mount 632a as suggested in FIG. 11. A pair of spaced-apart upstanding walls 600b (only one of which is shown) is provided in second lower trap mount 632a to define a space receiving small-nozzle blocker arm 134, second lift spring 532, and actuator arm 136 of second small-nozzle trap 432 therebetween. Each of upstanding walls 600b is formed to include a rod receiver channel 602 configured to receive one of first and second rod portions 138a and 138b to establish the location of fixed pivot axis 732 in nozzle inhibitor housing 140.

Figure 12D:
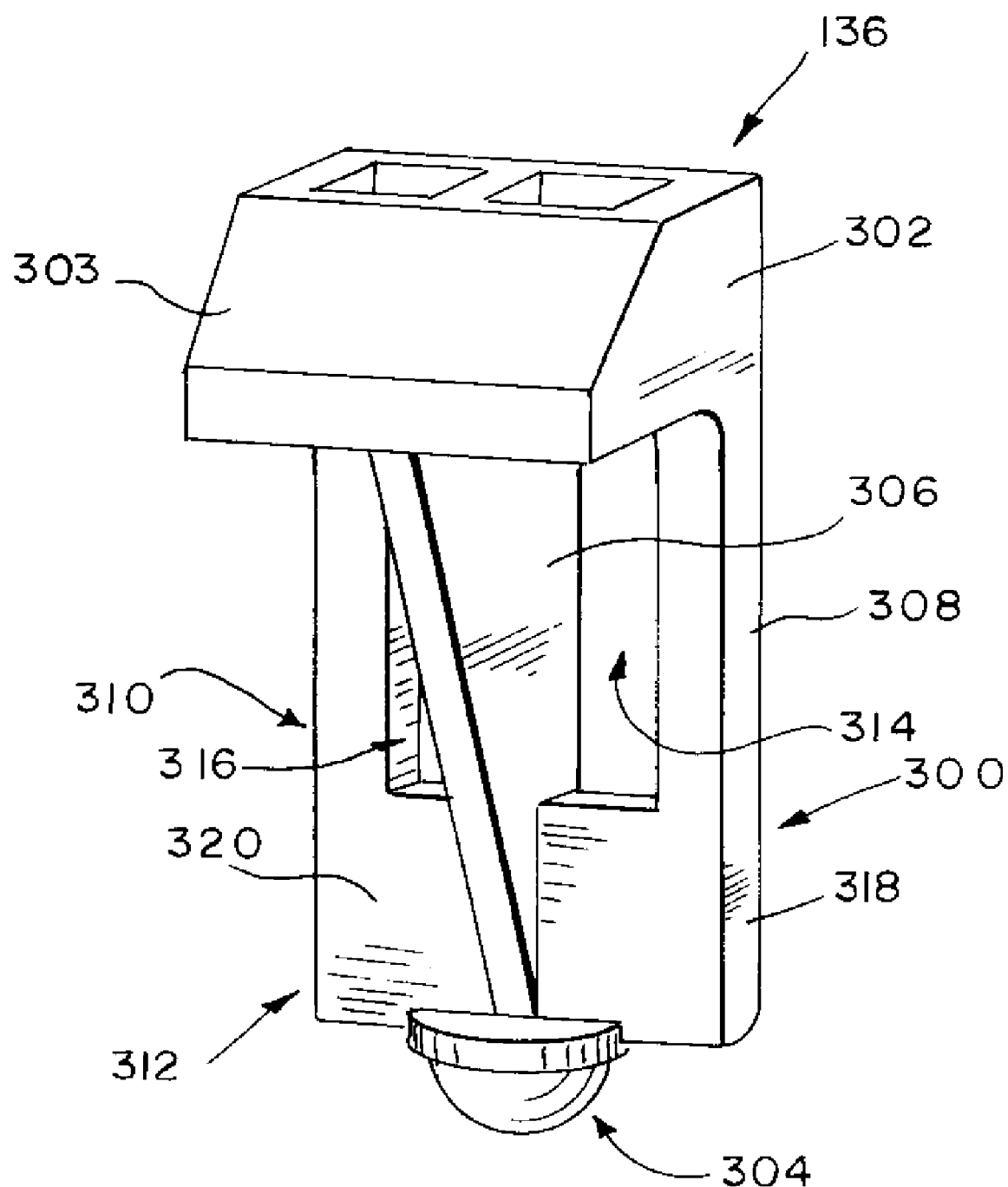
FIG. 12d is an enlarged perspective view of the actuator arm of FIGS. 12a and 12b showing a pair of stop flange receiver windows, a pivot-blocking plate under each of the windows, and an inclined cam ramp over both of the windows.

An illustrative actuator arm 136 is shown in FIG. 12d. Actuator arm 136 includes a vertical member 300, an inwardly turned lip 302 cantilevered to an upper portion of vertical member 300, a spring mount 304 appended to a lower portion of vertical member 300, and a triangle-shaped partition 306 arranged to mate with vertical member 300 and extend from spring mount 304 to inwardly turned lip 302 in a manner shown, for example, in FIG. 12d. Spring mount 304 is configured to engage and mate with an upper end of underlying lift spring 531 or 532 as shown, for example, in FIG. 12b. In illustrative embodiments, each actuator arm 136 is a monolithic element made of a plastics material.

Vertical member 300 is somewhat U-shaped and includes first and second upright legs 308, 310 and a lateral base 312 interconnecting lower portions of first and second upright legs 308, 310 as shown, for example, in FIG. 12d. Inwardly turned lip 302 is coupled to upper portions of first and second upright legs 308, 310 and arranged to extend laterally therebetween as suggested in FIG. 12d. Inwardly turned lip 302 includes an upwardly and inwardly facing inclined cam ramp 303 as shown in FIG. 12d.

Partition 306 is arranged to partition an opening formed in vertical member 300 and bounded by inner perimeter edges of lateral base 312, first upright leg 308, inwardly turned lip 302, and second upright leg 310 as shown, for example, in FIG. 12d. This "partitioning" forms a first stop flange receiver window 314 between partition 306 and first leg 308 and a second stop flange receiver window 316 between partition 306 and second leg 310 as shown in FIG. 12d. Partition 306 is also arranged to partition lateral base 312 to form a first pivot-blocking plate 318 under first stop flange receiver window 314 and a second pivot-blocking plate 320 under second stop flange receiver window 316. First stop flange receiver window 314 is sized to receive a portion of the free end of first stop flange 101 and second stop flange receiver window 316 is sized to receive a portion of the free end of second stop flange 102 when actuator arm 136 is moved downwardly in direction 26 to assume the lowered position as shown, for example, in FIG. 18.

Figure 18:
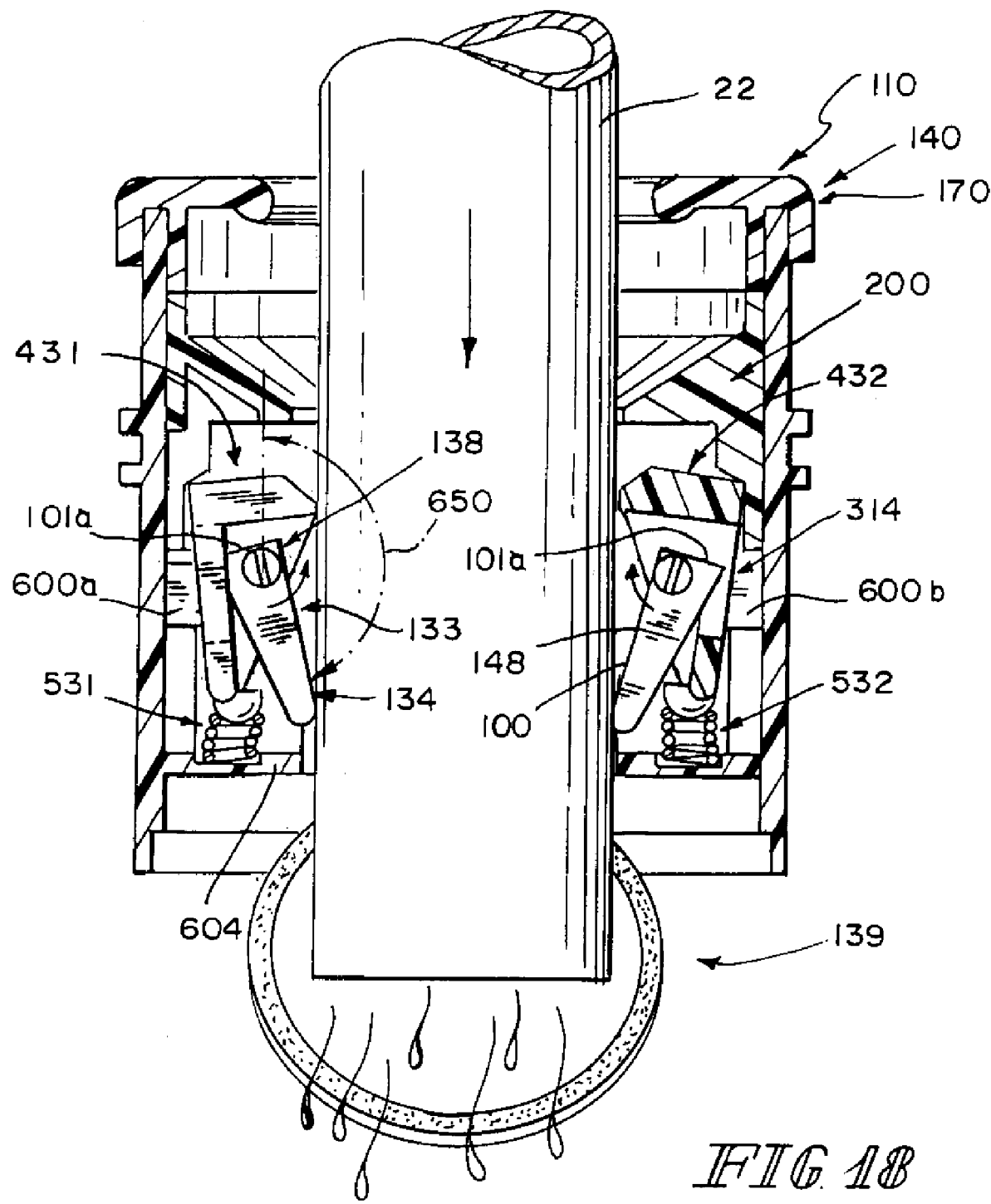

Small-nozzle blocker arm 134 is "locked" so that it cannot pivot about pivot rod 138 from the extended position shown in FIGS. 13 and 14 to the retracted position shown in FIG. 18 whenever actuator arm 136 is raised by its lift spring 531 or 532 to its raised position as shown in FIGS. 13 and 14. In this raised position, first stop face 101a on first stop flange 101 of small-nozzle blocker arm 134 engages first pivot-blocking plate 318 in actuator arm 136 to block pivoting movement of small-nozzle blocker arm 134 from its extended position toward its retracted position. At the same time, first pivot limiter 106 on first rod portion 138a engages first leg 308 of actuator arm 136 to block "over-rotation" of small-nozzle blocker arm 134 away from the retracted position so as to stop in the extended position shown in FIG. 13. Also in this raised position, second stop face 102b on second stop flange 102 of small-nozzle blocker arm 134 engages second pivot-blocking plate 320 in actuator arm 136 to block pivoting movement of small-nozzle blocker arm 134 from its extended position toward its retracted position. At the same time, second pivot limiter 107 on second rod portion 138b engages second leg 310 of actuator arm 136 to block over-rotation of small-nozzle blocker arm 134 away from the retracted position so as to stop in the extended position shown in FIG. 13.

As suggested in FIGS. 11 and 13, first lift spring 531 includes a lower end that fits into a spring receiver 603 formed in a floor 604 provided in nozzle inhibitor housing 140. An upper end of first lift spring 531 mates with spring mount 304 included in arm actuator 136 of first small-nozzle trap 431. Likewise, second lift spring 532 includes a lower end that fits into a spring receiver 605 formed in floor 604. An upper end of second lift spring 532 mates with spring mount 304 included in actuator arm 136 of second small-nozzle trap 432. These lift springs 531, 532 provide means for lifting actuator arms 136 in direction 28 to assume their raised positions.

Figure 15:
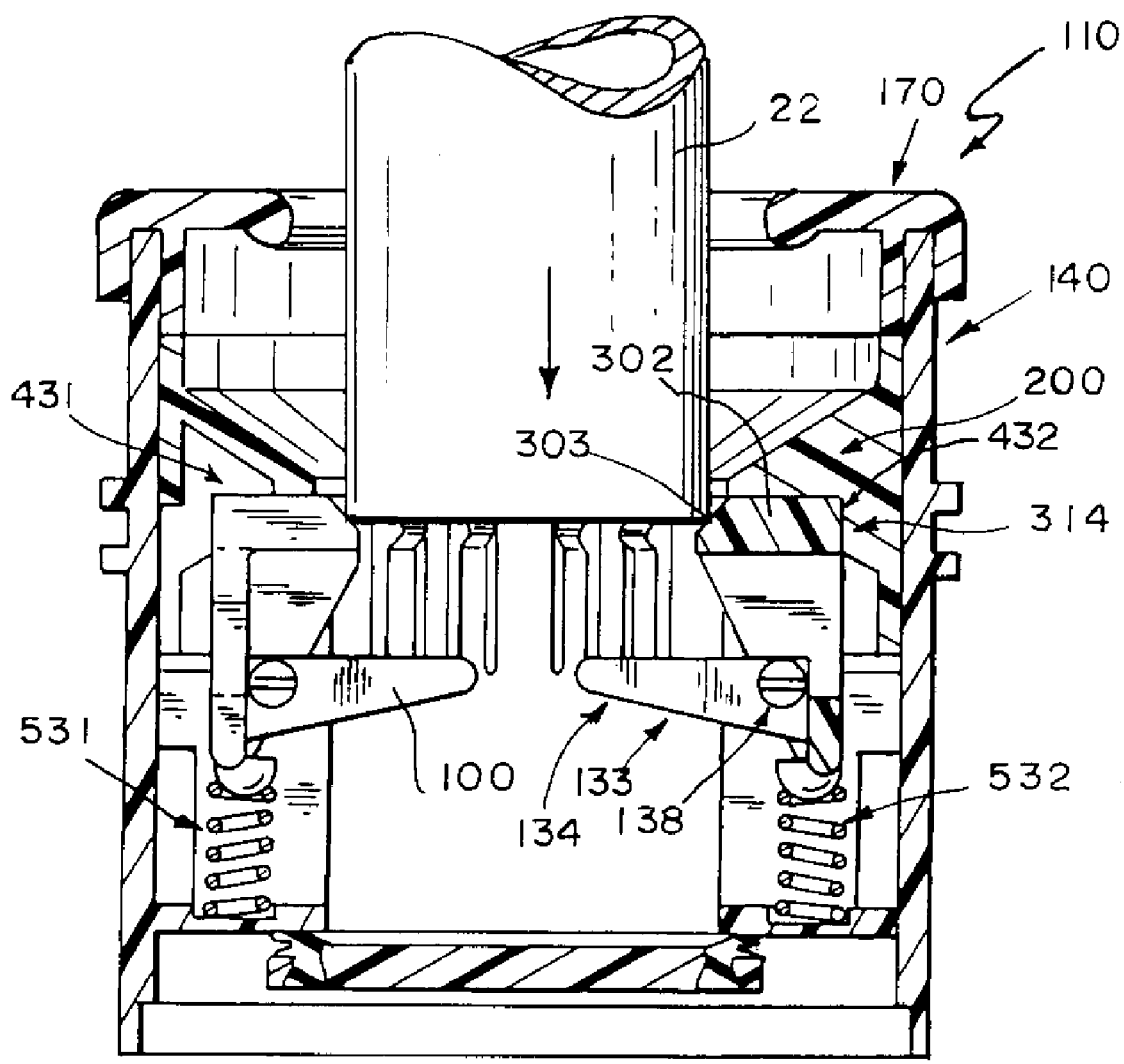
FIGS. 15-18 show downward movement of an "authorized" large-diameter "diesel" fuel-dispensing pump nozzle in a nozzle inhibitor housing in a fuel tank filler neck to "disable" the two opposing small-nozzle traps (by unlocking and retracting the small-nozzle blocker arms) and "open" the pivotable inner flapper door to enable a nozzle operator to pump diesel fuel into a fuel tank through the fuel tank filler neck using the large-diameter diesel fuel-dispensing pump nozzle.

Downward movement of an "authorized large-diameter "diesel" fuel-dispensing pump nozzle 22 in a nozzle inhibitor housing 140 in a fuel tank filler neck to "disable" the two opposing small-nozzle traps 431, 432 (by unlocking and retracting the small-nozzle blocker arms) and "open" the pivotable inner flapper door 139 to enable a nozzle operator to pump diesel fuel into a fuel tank through the fuel tank filler neck using the large-diameter diesel fuel-dispensing pump nozzle 122 is shown in FIGS. 15-18. Initial contact of a tip of downwardly moving large-diameter nozzle 22 against an inclined cam ramp 303 provided on actuator arm 136 of each of small-nozzle traps 431, 432 is shown in FIG. 15. Small-nozzle blocker arm 134 of each of small-nozzle traps 431, 432 remains locked in a "passageway-closing," small-nozzle rapping extended position (owing to pivot-blocking engagement with companion actuator arms 136) at this stage of nozzle entry into the filler neck.

Figure 16:
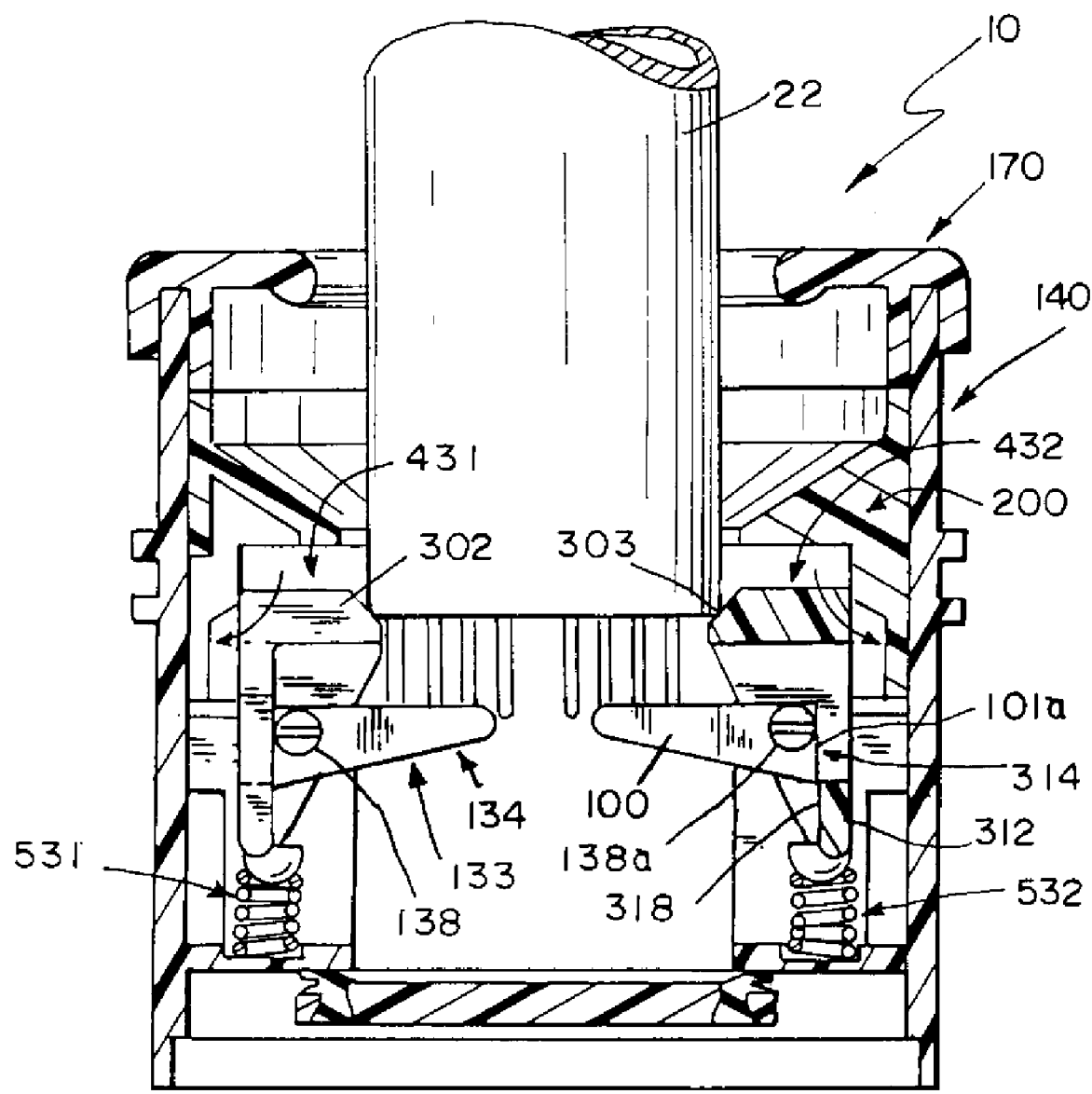

Continued downward movement of large-diameter nozzle 22 (as shown in FIG. 16) causes actuator arms 136 included in both of small-nozzle traps 431, 432 to move downwardly relative to companion small-nozzle blocker arms 134 and to nozzle inhibitor housing 140 to begin to compress return springs 531, 532 under actuator arms 136. Such actuator arm movement causes rearwardly extending stop flanges 101, 102 of each small-nozzle blocker arm 134 to confront companion stop flange receiver window 314, 316 formed in actuator arm 136 to disengage that stop flange 101, 102 from a pivot-blocking plate 318, 320 included in actuator arm 136 so as to free small-nozzle blocker arm 134 to pivot on a companion pivot rod 138 about a pivot axis relative to nozzle inhibitor housing 140 to increase an "included" angle 650 defined between each blocker arm 134 and its companion actuator arm 136 toward a "passageway-opening," large-nozzle admitting retracted position as suggested in FIGS. 17 and 18.

Figure 17:
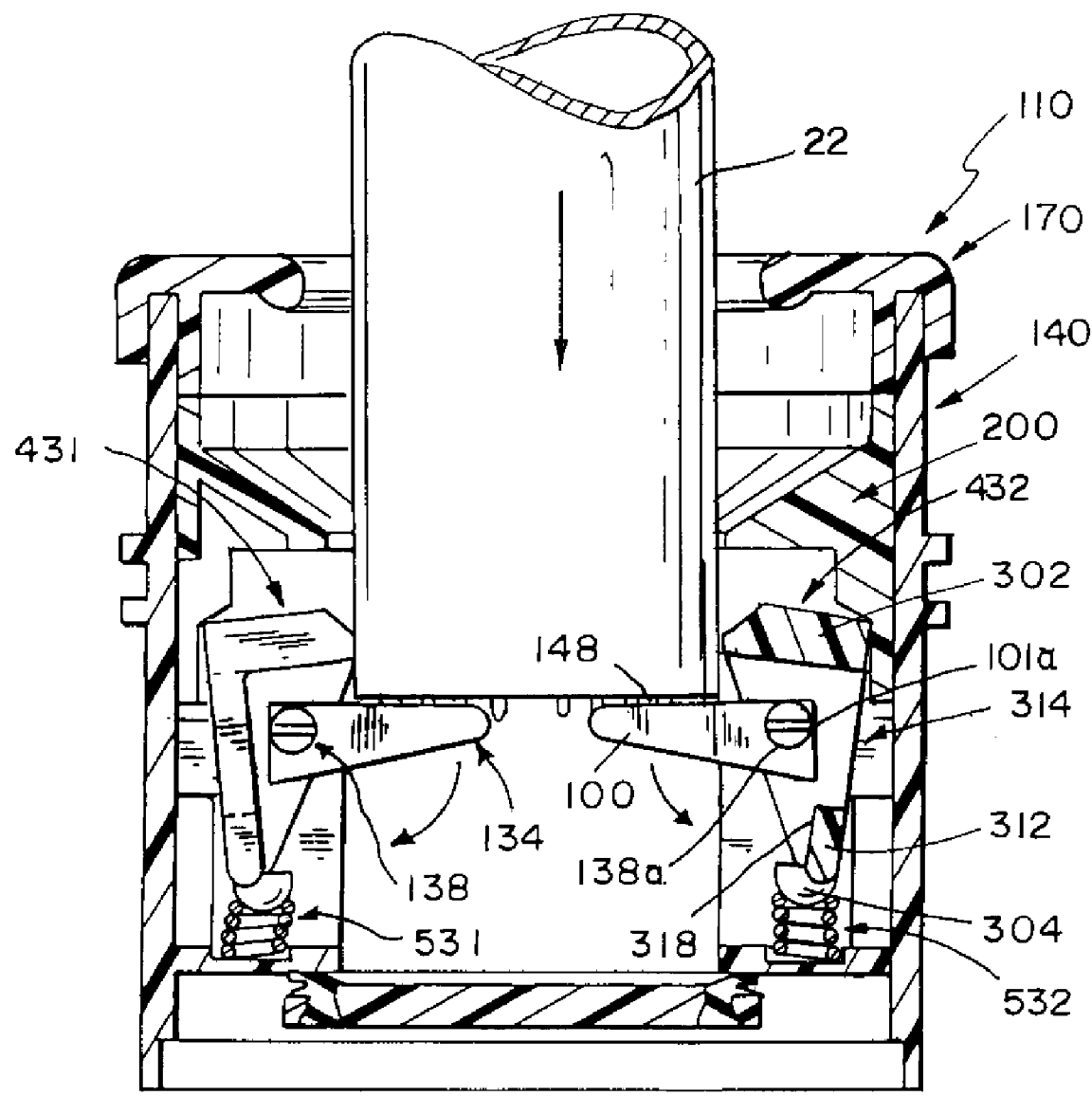

Further downward movement of large-diameter nozzle 22 is shown in FIG. 17 to spread upper ends of actuator arms 136 included in small-nozzle traps 431, 432 away from one another to open a space between actuator arms 136 that is wide enough to receive moving large-diameter nozzle 22 therein. Continued downward movement of large-diameter nozzle 22 through nozzle inhibitor housing 140 past retracted small-nozzle traps 431, 432 and mounted on nozzle inhibitor housing 140 and showing diesel fuel being dispensed from large-diameter nozzle 22 into the lower portion of the fuel tank filler neck is shown in FIG. 18.

The invention claimed is:

1. A nozzle inhibitor apparatus comprising
   a fill tube adapted to be coupled to a fuel tank of a motor vehicle having a diesel engine and
   inhibitor means for preventing insertion of a small-diameter unleaded fuel nozzle into the fill tube while allowing insertion of a large-diameter diesel fuel nozzle into the fill tube, wherein the inhibitor means includes
   a nozzle inhibitor housing formed to include an interior region communicating with a passageway formed in the fill tube,
   a first small-nozzle trap including a first blocker unit mounted in the interior region of the nozzle inhibitor housing for pivotable movement about a first pivot axis between a small-nozzle blocking extended position and a large-nozzle admitting retracted position and a first return spring coupled to the first blocker unit, and
   a second small-nozzle trap including a second blocker unit mounted in the interior region of the nozzle inhibitor housing for pivotable movement about a second pivot axis between a small-nozzle blocking extended position and a large-nozzle admitting retracted position and a second return spring coupled to the second blocker unit,
   wherein the first and second return springs cooperate normally to yieldably urge the first and second blocker units to the small-nozzle blocking extended positions where the first and second blocker units cooperate to contact a tip of a small-diameter unleaded fuel nozzle having a first outer diameter and moving inwardly in the interior region of the nozzle inhibitor housing toward the passageway formed in the fill tube to block further inward movement of the small-diameter unleaded fuel nozzle,
   wherein the first and second blocker units cooperate, upon movement of the first and second blocker units to assume the large-nozzle admitting retracted positions, to define a widened nozzle-receiving opening therebetween to allow movement of a large-diameter diesel fuel nozzle having a second outer diameter larger than the first outer diameter past the first and second blocker units and through the widened nozzle-receiving opening further inwardly into the passageway of the fill tube, and wherein the first blocker unit includes a first pivot rod arranged to extend along the first pivot axis and a first blocker arm coupled to the first pivot rod, the first small-nozzle trap further includes a first actuator arm coupled to the first pivot rod for movement relative to the first blocker arm about the first pivot axis, the second blocker unit includes a second pivot rod arranged to extend along the second pivot axis and a second blocker arm coupled to the second pivot rod, the second small-nozzle trap further includes a second actuator arm coupled to the second pivot rod for movement relative to the second blocker arm about the second pivot axis, the first and second actuator arms cooperate to define means for establishing a small-nozzle channel therebetween adapted to receive the small-diameter unleaded fuel nozzle therein upon movement of the small-diameter unleaded fuel nozzle in the interior region of the nozzle inhibitor housing to contact the first and second blocker units while the first and second blocker units are urged to assume their small-nozzle blocking extended positions, the first return spring is coupled to the first actuator arm and configured to provide means for pivoting the first blocker unit about the first pivot axis relative to the first actuator arm normally to increase an included angle defined between the first blocker arm and the first actuator arm to cause the first blocker arm to move away from the large-nozzle admitting retracted position to assume the small-nozzle blocking extended position, and the second return spring is coupled to the second actuator arm and configured to provide means for pivoting the second blocker unit about the second pivot axis relative to the second actuator arm normally to increase an included angle defined between the second blocker arm and the second actuator arm to cause the second blocker arm to move away from the large-nozzle admitting retracted position to assume the small-nozzle blocking extended position.

2. The apparatus of claim 1, wherein each of the first and second small-nozzle traps is constrained to move up and down in channels formed in the nozzle inhibitor housing between a raised position wherein the first and second blocker units are moved to assume the small-nozzle blocking extended positions and a lowered position wherein the first and second blocker units are moved to assume the large-nozzle admitting retracted positions, and the inhibitor means further includes a first lift spring configured to provide means normally for yieldably moving the first small-nozzle trap relative to the nozzle inhibitor housing to the raised position so that the first blocker unit is moved to assume the small-nozzle blocking extended position and the first actuator arm is arranged to be engaged and moved by a large-diameter nozzle moving in the interior region of the nozzle inhibitor housing toward the passageway of the fill tube to cause movement of the first blocker unit to the large-nozzle admitting retracted position and a second lift spring configured to provide means for normally yieldably moving the second small-nozzle trap relative to the nozzle inhibitor housing to the raised position so that the second blocker unit is moved to assume the small-nozzle blocking extended position and the second actuator arm is arranged to be engaged and moved by a large-diameter nozzle moving in the interior region of the nozzle inhibitor housing toward the passageway of the fill tube to cause movement of the second blocker unit to the large-nozzle admitting retracted position.

3. A nozzle inhibitor apparatus comprising
a fill tube adapted to be coupled to a fuel tank of a motor vehicle having a diesel engine and
inhibitor means for preventing insertion of a small-diameter unleaded fuel nozzle into the fill tube while allowing insertion of a large-diameter diesel fuel nozzle into the fill tube, wherein the inhibitor means includes
a nozzle inhibitor housing formed to include an interior region communicating with a passageway formed in the fill tube,
a first small-nozzle trap including a first blocker unit mounted in the interior region of the nozzle inhibitor housing for pivotable movement about a first pivot axis between a small-nozzle blocking extended position and a large-nozzle admitting retracted position and a first return spring coupled to the first blocker unit, and
a second small-nozzle trap including a second blocker unit mounted in the interior region of the nozzle inhibitor housing for pivotable movement about a second pivot axis between a small-nozzle blocking extended position and a large-nozzle admitting retracted position and a second return spring coupled to the second blocker unit,
wherein the first and second return springs cooperate normally to yieldably urge the first and second blocker units to the small-nozzle blocking extended positions where the first and second blocker units cooperate to contact a tip of a small-diameter unleaded fuel nozzle having a first outer diameter and moving inwardly in the interior region of the nozzle inhibitor housing toward the passageway formed in the fill tube to block further inward movement of the small-diameter unleaded fuel nozzle,
wherein the first and second blocker units cooperate, upon movement of the first and second blocker units to assume the large-nozzle admitting retracted positions, to define a widened nozzle-receiving opening therebetween to allow movement of a large-diameter diesel fuel nozzle having a second outer diameter larger than the first outer diameter past the first and second blocker units and through the widened nozzle-receiving opening further inwardly into the passageway of the fill tube, and
wherein the inhibitor means further includes a first lift spring associated with the first small-nozzle trap, the nozzle inhibitor housing includes a first trap guide configured to provide means for guiding up-and-down movement of the first small-nozzle trap relative to the nozzle inhibitor housing during movement of the first small-nozzle trap from a raised position in the nozzle inhibitor housing in a downward direction toward the fill tube and a lowered position in the nozzle inhibitor housing to compress the first lift spring and also during movement of the first small-nozzle trap from the lowered position in an opposite upward direction toward the raised position in response to a lifting force applied by decompression of the first lift spring.

4. The apparatus of claim 3, wherein the first blocker unit includes a pivot rod and a small-nozzle blocker arm coupled to the pivot rod, the first small-nozzle trap further includes an actuator arm mounted on the pivot rod and coupled to the first return spring, the small-nozzle blocker arm is arranged to pivot about a pivot axis established by the pivot rod relative to the actuator arm to decrease an included angle defined between the small-nozzle blocker arm and the actuator arm during movement of the first small-nozzle trap in the first trap guide from the raised position toward the lowered position.

5. The apparatus of claim 4, wherein the nozzle inhibitor housing includes a floor arranged to underlie the pivot rod and the first lift spring is interposed between and in engagement with the small-nozzle blocker arm and the floor.

6. The apparatus of claim 5, wherein the first trap guide includes an arm-pivot wall coupled to the floor and arranged to extend in an upward direction away from the floor and the fill tube and to terminate at a top edge, the small-nozzle blocker arm includes an outer portion coupled to the pivot rod and an inner portion adapted to engage a small-diameter unleaded fuel nozzle moving in the interior region of the nozzle inhibitor housing when the first blocker unit is located in the small-nozzle blocking extended position, the outer portion of the small-nozzle blocker arm is arranged to engage and to rotate in a first rotational direction about the top edge of the arm-pivot wall to compress the first return spring and to cause the small-nozzle blocker arm to pivot relative to the actuator arm about the pivot axis and decrease the included angle between the small-nozzle blocker arm and the actuator arm during movement of the first small-nozzle trap from the raised position to the lowered position, and the first return spring is configured to decompress to apply a yieldable torque to the small-nozzle blocker arm to urge the small-nozzle blocker arm to rotate in an opposite second rotational direction about the top edge of the arm-pivot wall during movement of the first small-nozzle trap from the lowered position to the raised position.

7. The apparatus of claim 6, wherein the first trap guide includes a first upright member coupled to the floor and formed to include a vertically extending first rod-receiver channel and a second upright member coupled to the floor and formed to include a vertically extending second rod-receiver channel and arranged to lie in spaced-apart relation to the first upright member to locate the first lift spring and the arm-pivot wall therebetween, the pivot rod includes a first free end arranged to slide up and down in the first rod-receiver channel as the first small-nozzle trap moves between the raised and lowered positions, a second free end arranged to slide up and down in the second rod-receiver channel as the first small-nozzle trap moves between the raised position to uncompress the first lift spring and the lowered position to compress the first lift spring and a middle portion arranged to interconnect the first and second free ends and coupled to the small-nozzle blocker arm and to the actuator arm.

8. The apparatus of claim 4, wherein the first trap guide includes a first upright member formed to include a first rod-receiver channel and a second upright member formed to include a second rod-receiver channel, the pivot rod includes a first free end arranged to slide up and down in the first rod-receiver channel as the first small-nozzle trap moves between the raised and lowered positions, a second free end arranged to slide up and down in the second rod-receiver channel as the first small-nozzle trap moves between the raised and lowered positions, and a middle portion arranged to lie between the first and second free ends and coupled to the small-nozzle blocker arm and to the actuator arm.

9. The apparatus of claim 8, wherein the first trap guide further includes an arm-pivot wall located between the first and second upright members and arranged to terminate at a top edge underlying the small-nozzle blocker arm upon movement of the first blocker unit to assume the small-nozzle blocking extended position, the small-nozzle blocker arm includes an outer portion coupled to the pivot rod and an inner portion adapted to engage a small-diameter unleaded fuel nozzle moving in the interior region of the nozzle inhibitor housing when the first blocker unit is located in the small-nozzle blocking extended position, the outer portion of the small-nozzle blocker arm is arranged to engage and to rotate in a first rotational direction about the top edge of the arm-pivot wall to compress the first return spring and to cause the small-nozzle blocker arm to pivot relative to the actuator arm about the pivot axis and decrease the included angle between the small-nozzle blocker arm and the actuator arm during movement of the first small-nozzle trap from the raised position to the lowered position, and the first return spring is configured to decompress to apply a yieldable torque to the small-nozzle blocker arm to urge the small-nozzle blocker arm to rotate in an opposite second rotational direction about the top edge of the arm-pivot wall during movement of the first small-nozzle trap from the lowered position to the raised position.

10. The apparatus of claim 8, wherein inhibitor means further includes a lid coupled to the nozzle inhibitor housing the first trap guide further includes a first trap limiter coupled to the lid and arranged to extend downwardly from the lid into the interior region of the nozzle inhibitor housing, the first trap limiter includes spaced-apart downwardly extending first and second legs, each of the first and second legs includes a horizontally extending top wall, an inclined guide wall, and a vertically extending guide wall interconnecting the horizontally extending top wall and the inclined guide wall, and the first nozzle trap further includes a first pin coupled to the actuator arm and arranged to ride on the inclined and vertically extending guide walls of the first leg during movement of the first small-nozzle trap between the raised and lowered positions and a second pin coupled to the actuator arm and arranged to ride on the inclined and vertically extending guide walls of the second leg during movement of the first small-nozzle trap between the raised and lower positions.

11. A nozzle inhibitor apparatus comprising
a fill tube adapted to be coupled to a fuel tank of a motor vehicle having a diesel engine and
inhibitor means for preventing insertion of a small-diameter unleaded fuel nozzle into the fill tube while allowing insertion of a large-diameter diesel fuel nozzle into the fill tube, wherein the inhibitor means includes
a nozzle inhibitor housing formed to include an interior region communicating with a passageway formed in the fill tube,
a first small-nozzle trap including a first blocker unit mounted in the interior region of the nozzle inhibitor housing for pivotable movement about a first pivot axis between a small-nozzle blocking extended position and a large-nozzle admitting retracted position and a first return spring coupled to the first blocker unit, and
a second small-nozzle trap including a second blocker unit mounted in the interior region of the nozzle inhibitor housing for pivotable movement about a second pivot axis between a small-nozzle blocking extended position and a large-nozzle admitting retracted position and a second return spring coupled to the second blocker unit,
wherein the first and second return springs cooperate normally to yieldably urge the first and second blocker units to the small-nozzle blocking extended positions where the first and second blocker units cooperate to contact a tip of a small-diameter unleaded fuel nozzle having a first outer diameter and moving inwardly in the interior region of the nozzle inhibitor housing toward the passageway formed in the fill tube to block further inward movement of the small-diameter unleaded fuel nozzle, wherein the first and second blocker units cooperate, upon movement of the first and second blocker units to assume the large-nozzle admitting retracted positions, to define a widened nozzle-receiving opening therebetween to allow movement of a large-diameter diesel fuel nozzle having a second outer diameter larger than the first outer diameter past the first and second blocker units and through the widened nozzle-receiving opening further inwardly into the passageway of the fill tube, and wherein the first blocker unit includes a first pivot rod arranged to extend along the first pivot axis and a first blocker arm coupled to the first pivot rod, the first small-nozzle trap further includes a first actuator arm coupled to the first pivot rod for movement relative to the first blocker arm about the first pivot axis, the second blocker unit includes a second pivot rod arranged to extend along the second pivot axis and a second blocker arm coupled to the second pivot rod, the second small-nozzle trap further includes a second actuator arm coupled to the second pivot rod for movement relative to the second blocker arm about the second pivot axis, the first and second actuator arms cooperate to define means for establishing a small-nozzle channel therebetween adapted to receive the small-diameter unleaded fuel nozzle therein upon movement of the small-diameter unleaded fuel nozzle in the interior region of the nozzle inhibitor housing to contact the first and second blocker units while the first and second blocker units are urged to assume their small-nozzle blocking extended positions, the first return spring is coupled to the first pivot rod and arranged to engage the nozzle inhibitor housing to provide means for pivoting the first blocker unit about the first pivot axis relative to the first actuator arm normally to decrease an included angle defined between the first blocker arm and the first actuator arm to cause the first blocker unit to move away from the large-nozzle admitting retracted position to assume the small-nozzle blocking extended position, and the second return spring is coupled to the second pivot rod and arranged to engage the nozzle admitting housing to provide means for pivoting the second blocker unit about the second pivot axis relative to the second actuator arm normally to decrease an included angle defined between the second blocker arm and the second actuator arm to cause the second blocker unit to move away from the large-nozzle admitting retracted position to assume the small-nozzle blocking extended position.

12. The apparatus of claim 11, wherein the first actuator arm is constrained in the nozzle inhibitor housing to move up and down relative to the first blocker arm between raised and lowered positions, the second actuator arm is constrained in the nozzle inhibitor housing to move up and down relative to the second blocker arm between raised and lowered positions, the inhibitor means further includes first and second lift springs, the first lift spring is coupled to the nozzle inhibitor housing and to the first actuator arm and configured to provide means for yieldably moving the first actuator arm relative to the nozzle inhibitor housing and to the first blocker arm normally to the raised position to cause the first actuator arm to block movement of the first blocker unit from the small-nozzle blocking extended position to the large-nozzle admitting extended position, and the second lift spring is coupled to the nozzle inhibitor housing and to the second actuator arm and configured to provide means for yieldably moving the second actuator arm relative to the nozzle inhibitor housing and to the second blocker arm normally to the raised position to cause the second actuator arm to block movement of the second blocker unit from the small-nozzle blocking extended position to the large-nozzle admitting retracted position.

13. The apparatus of claim 12, wherein the first and second actuator arms cooperate to engage a large-diameter diesel fuel nozzle moving downwardly in the nozzle inhibitor housing are arranged to move downwardly in the nozzle inhibitor housing toward the lowered portions to compress the first and second lift springs in response to downward forces applied by the downwardly moving large-diameter diesel fuel nozzle, the first actuator arm is configured to include means for releasing the first blocker arm to allow pivoting movement of the first blocker arm about the first pivot axis to allow movement of the second blocker unit from the small-nozzle blocking extended position to the large-nozzle admitting retracted position in response to downward movement of the first actuator arm in the nozzle inhibitor housing toward the lowered position, and the second actuator arm is configured to include means for releasing the second blocker arm to allow unblocking pivoting movement of the second blocker arm about the second pivot axis to allow movement of the second blocker unit from the small-nozzle blocking extended position to the large-nozzle admitting retracted position in response to downward movement of the second actuator arm in the nozzle inhibitor housing toward the lowered position.

14. A nozzle inhibitor apparatus comprising a fill tube adapted to be coupled to a fuel tank of a motor vehicle having a diesel engine and inhibitor means for preventing insertion of a small-diameter unleaded fuel nozzle into the fill tube while allowing insertion of a large-diameter diesel fuel nozzle into the fill tube, wherein the inhibitor means includes a nozzle inhibitor housing formed to include an interior region communicating with a passageway formed in the fill tube, a first small-nozzle trap including a first blocker unit mounted in the interior region of the nozzle inhibitor housing for pivotable movement about a first pivot axis between a small-nozzle blocking extended position and a large-nozzle admitting retracted position and a first return spring coupled to the first blocker unit, and a second small-nozzle trap including a second blocker unit mounted in the interior region of the nozzle inhibitor housing for pivotable movement about a second pivot axis between a small-nozzle blocking extended position and a large-nozzle admitting retracted position and a second return spring coupled to the second blocker unit, wherein the first and second return springs cooperate normally to yieldably urge the first and second blocker units to the small-nozzle blocking extended positions where the first and second blocker units cooperate to contact a tip of a small-diameter unleaded fuel nozzle having a first outer diameter and moving inwardly in the interior region of the nozzle inhibitor housing toward the passageway formed in the fill tube to block further inward movement of the small-diameter unleaded fuel nozzle, wherein the first and second blocker units cooperate, upon movement of the first and second blocker units to assume the large-nozzle admitting retracted positions, to define a widened nozzle-receiving opening therebetween to allow movement of a large-diameter diesel fuel nozzle having a second outer diameter larger than the first outer diameter past the first and second blocker units and through the widened nozzle-receiving opening further inwardly into the passageway of the fill tube, wherein the first blocker unit includes a first pivot rod arranged to extend along the first pivot axis and a first blocker arm coupled to the first pivot rod, and the first pivot rod is coupled to the nozzle inhibitor housing to establish a stationary location of the first pivot axis in the nozzle inhibitor housing and rotate about the first pivot axis during movement of the first blocker unit between the large-nozzle admitting retracted position and the small-nozzle blocking extended position, and wherein the nozzle housing is formed to include a first lower trap mount including a pair of spaced-apart walls arranged to define a space therebetween receiving the first blocker arm and each of the walls is formed to include a rod receiver channel configured to receive a portion of the first pivot rod therein to establish the stationary location of the first pivot axis and support the first pivot rod for rotation about the first pivot axis.

15. The apparatus of claim 14, wherein the first small-nozzle trap further includes a first actuator arm associated with the first blocker unit, the first actuator arm is mounted for movement in the nozzle inhibitor housing between a raised position and a lowered position, the first actuator arm is configured to provide blocker means for blocking pivoting movement of the first blocker arm about the first pivot axis to block movement of the first blocker unit from the small-nozzle blocking extended position to the large-nozzle admitting retracted position as long as the first actuator arm remains in the raised position and until downward movement of the first actuator arm in the nozzle inhibitor housing toward the fill tube and the lowered position.

16. The apparatus of claim 15, wherein the first blocker arm includes a nozzle barrier arranged and adapted to contact a nozzle moving in the nozzle inhibitor housing and first and second stop flanges coupled to the nozzle barrier and arranged to lie in spaced-apart relation to one another to define a slot located therebetween and arranged to receive a partition included in the first actuator arm, blocker means includes a first pivot-blocking plate arranged to engage the first stop flange upon movement of the first actuator arm to the raised position to block pivoting movement of the first blocker unit from the small-nozzle blocking extended position to the large-nozzle admitting retracted position, and a second pivot-blocking plate arranged to engage the second stop flange upon movement of the first actuator arm to the raised position to block pivoting movement of the first blocker unit from the small-nozzle blocking extended position to the large-nozzle admitting retracted position, and an inwardly turned lip formed to include an upwardly and inwardly facing inclined cam ramp and coupled to the partition.

17. The apparatus of claim 16, wherein the first actuator arm is formed to include a first stop flange receiver window located between the first pivot-blocking plate and the inwardly turned lip and sized to receive a portion of the first stop flange therein upon movement of the first actuator arm to the lowered position and the first blocker unit to the large-nozzle admitting retracted position and the first actuator arm is formed to include a second stop flange receiver window located between the second pivot-blocking plate and the inwardly turned lip and sized to receive a portion of the second stop flange therein upon movement of the first actuator arm to the lowered position and the first blocker unit to the large-nozzle admitting retracted position.

18. The apparatus of claim 15, wherein the nozzle inhibitor means further includes a first lift spring coupled to the nozzle inhibitor housing and to the first actuator arm and configured to provide means for yieldably moving the first actuator arm relative to the nozzle inhibitor housing and to the first blocker arm normally to the raised position.

19. The apparatus of claim 15, wherein the first blocker arm includes a nozzle barrier arranged and adapted to contact a nozzle moving in the nozzle inhibitor housing and a first stop flange coupled to the nozzle barrier blocker means includes a first pivot-blocking plate arranged to engage the first stop flange upon movement of the first actuator arm to the raised position to block pivoting movement of the first blocker unit from the small-nozzle blocking extended position to the large-nozzle admitting retracted position.

20. The apparatus of claim 19, wherein the first actuator arm is formed to include a first stop flange receiver window sized and arranged to receive a portion of the first stop flange therein upon movement of the first actuator arm to the lowered position and the first blocker unit to the large-nozzle admitting retracted position.

* * * * *